(12) United States Patent
Murao

(10) Patent No.: US 12,030,307 B2
(45) Date of Patent: Jul. 9, 2024

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Tatsuya Murao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 17/721,463

(22) Filed: Apr. 15, 2022

(65) Prior Publication Data
US 2022/0332126 A1    Oct. 20, 2022

(30) Foreign Application Priority Data
Apr. 15, 2021    (JP) ................................ 2021-069262

(51) Int. Cl.
*G06F 15/00* (2006.01)
*B41J 19/14* (2006.01)
*G06K 15/02* (2006.01)
*G06K 15/10* (2006.01)

(52) U.S. Cl.
CPC .......... *B41J 19/142* (2013.01); *G06K 15/102* (2013.01); *G06K 15/1817* (2013.01); *G06K 15/1861* (2013.01)

(58) Field of Classification Search
None
See application file for complete search history.

(56) References Cited

U.S. PATENT DOCUMENTS

| 6,497,467 | B2* | 12/2002 | Suwa ..................... | B41J 19/142 |
| | | | | 347/15 |
| 8,294,911 | B2* | 10/2012 | Amano ................... | G06K 15/00 |
| | | | | 358/1.16 |
| 2002/0140979 | A1* | 10/2002 | Tanaka ................... | G06K 15/10 |
| | | | | 358/1.17 |
| 2009/0059295 | A1* | 3/2009 | Mushano ............ | G03F 7/70508 |
| | | | | 358/1.16 |
| 2011/0032262 | A1* | 2/2011 | Furusawa ................ | G06T 1/60 |
| | | | | 345/545 |
| 2014/0285483 | A1* | 9/2014 | Yamanaka ............. | G09G 5/393 |
| | | | | 345/419 |

FOREIGN PATENT DOCUMENTS

JP    2016-215571 A    12/2016

* cited by examiner

*Primary Examiner* — Mark R Milia
(74) *Attorney, Agent, or Firm* — Venable LLP

(57) ABSTRACT

An image processing apparatus comprises a first storage and a second, a plurality of image processing units that perform image processing on pixel data of image data read from the first storage or the second storage, and a writing unit that writes the pixel data, processed by the plurality of image processing units, into the second storage. The plurality of image processing units include a directivity image processing unit that performs image processing on the image data in mutually different directions by reading and supplying to an image processing unit of the plurality of image processing units the pixel data written into the second storage. Target pixel data processed by the directivity image processing unit is written into the second storage in an order of arrangement which is different from the order of arrangement of pixels in the image data stored in the first storage.

10 Claims, 18 Drawing Sheets

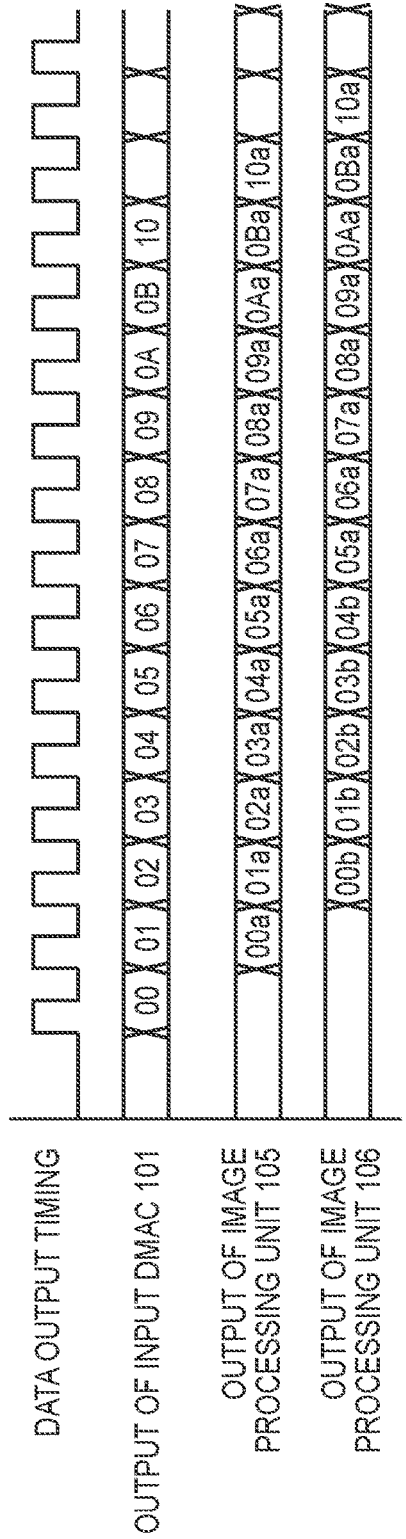
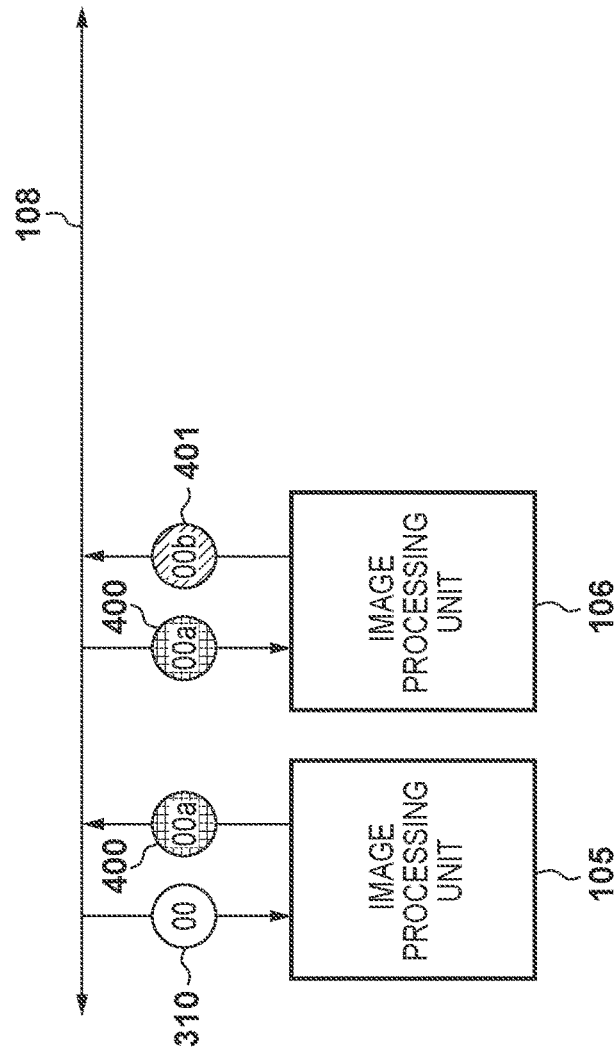
FIG. 4A
FIG. 4B

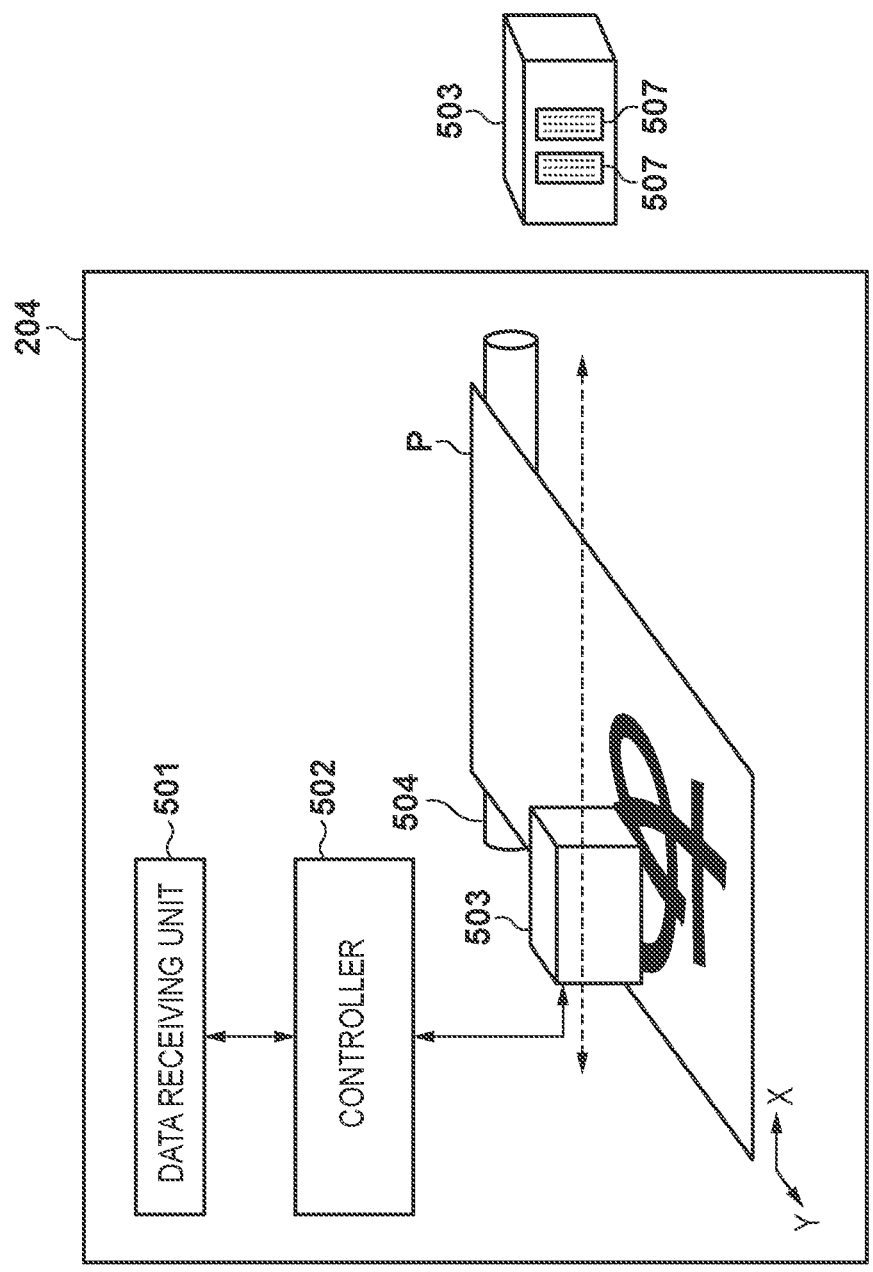

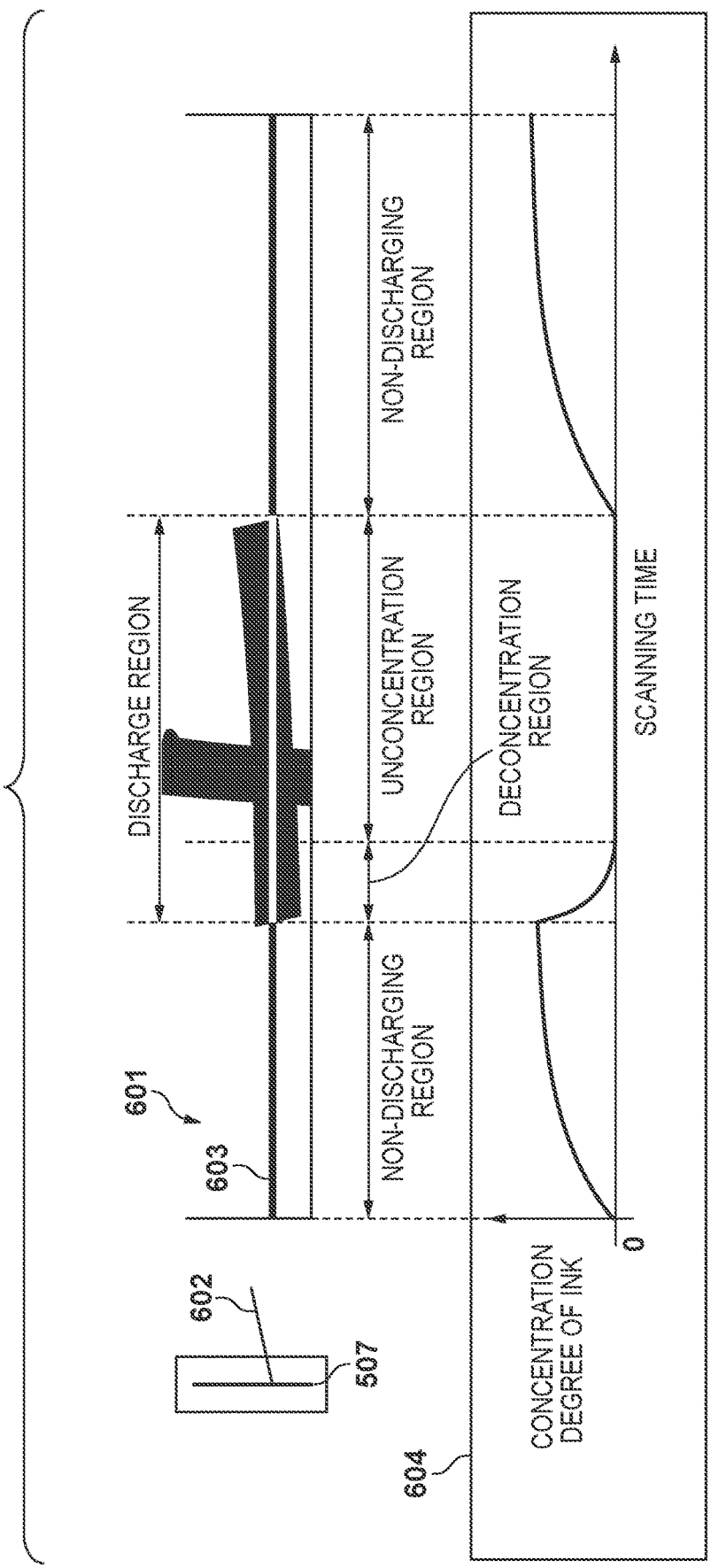

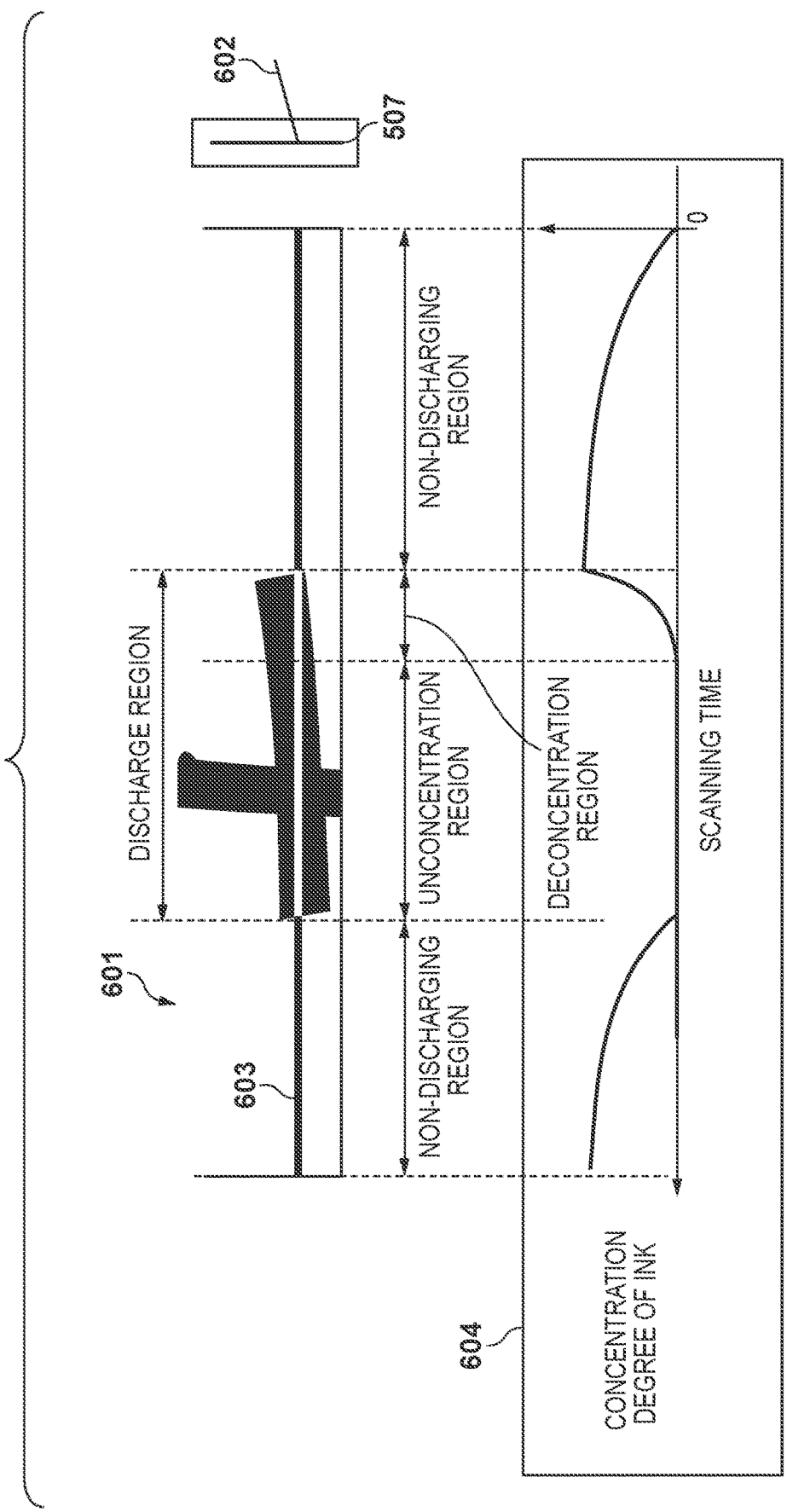

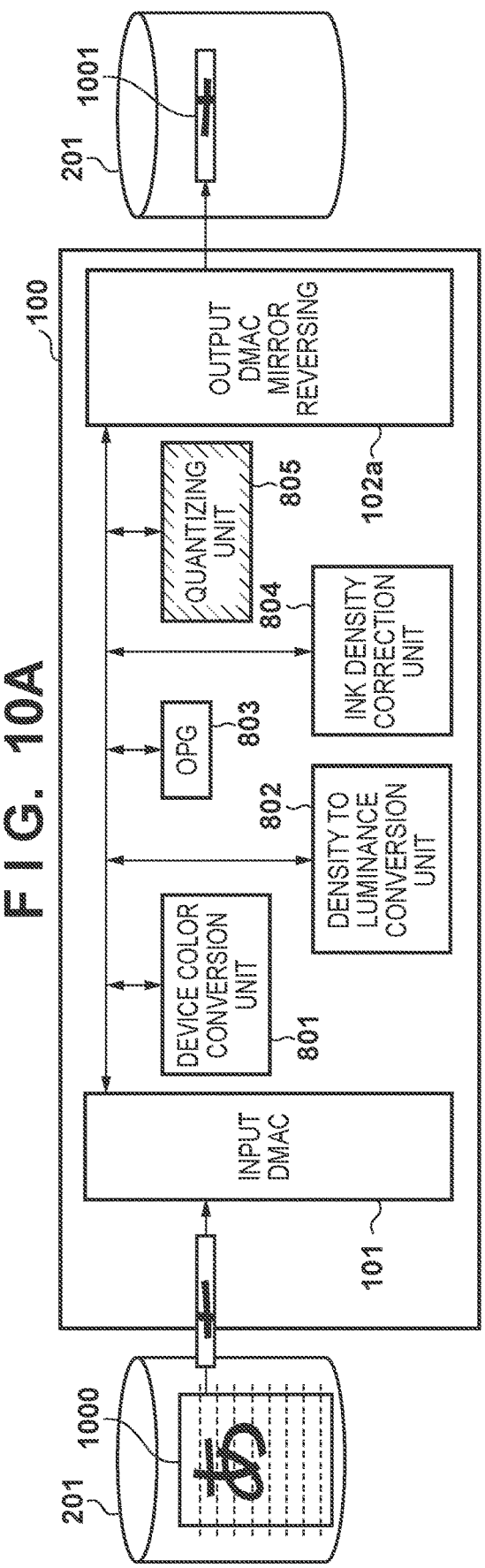
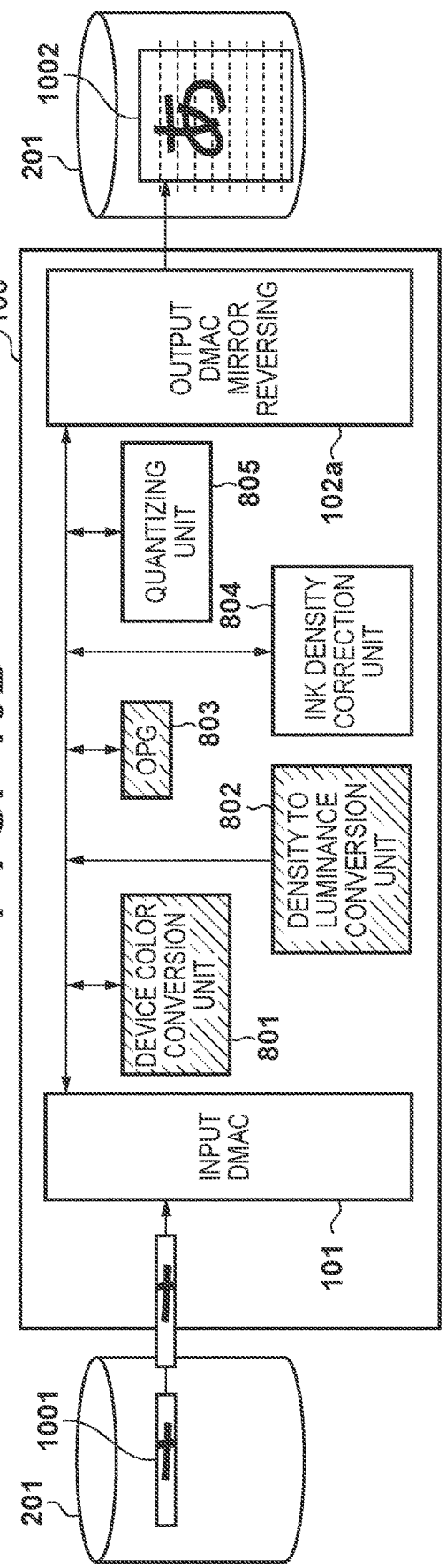

CANNOT OUTPUT UNTIL IMAGE BUFFER IS ACCUMULATED

IMAGE BUFFER IS ACCUMULATED
→INPUT 1 PIXEL OUTPUT 1 PIXEL

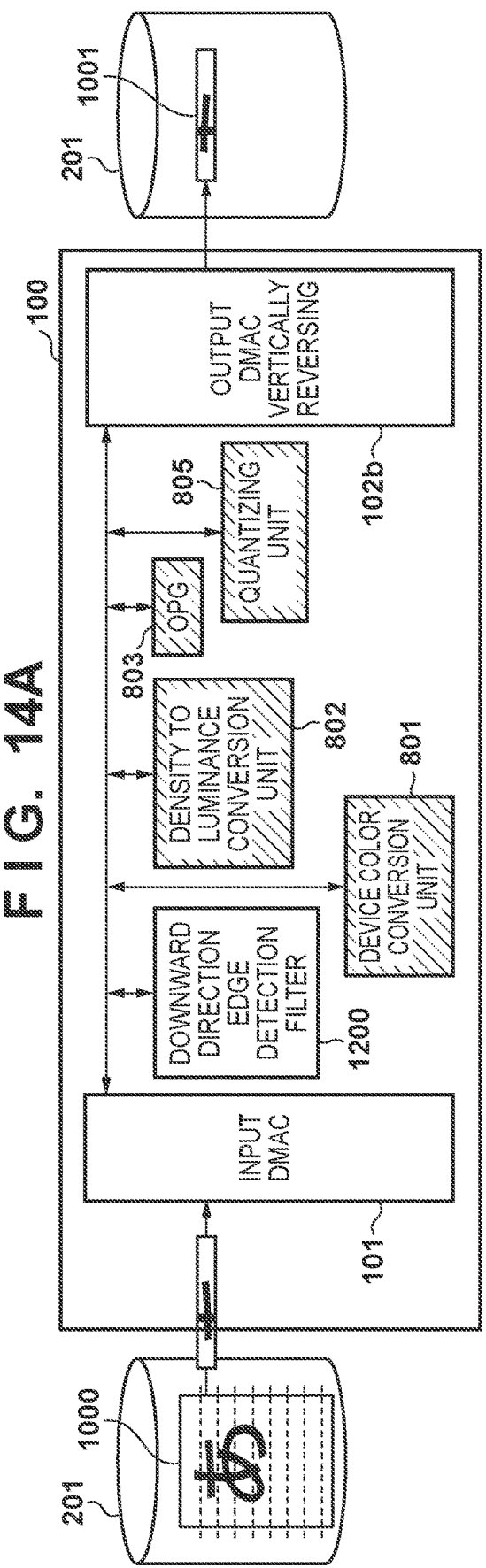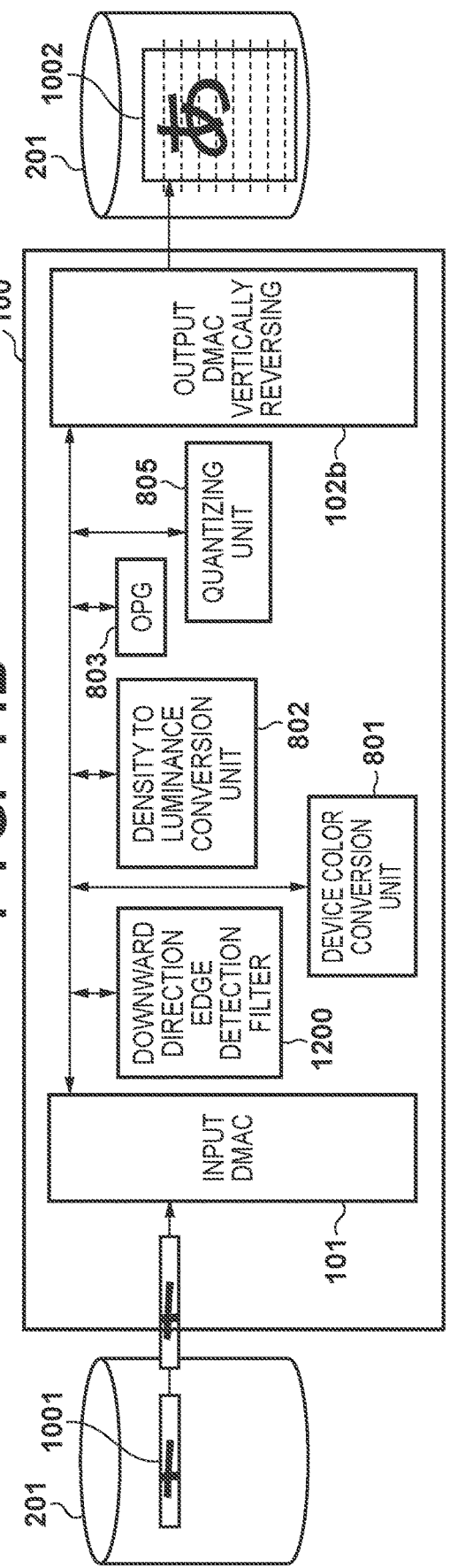

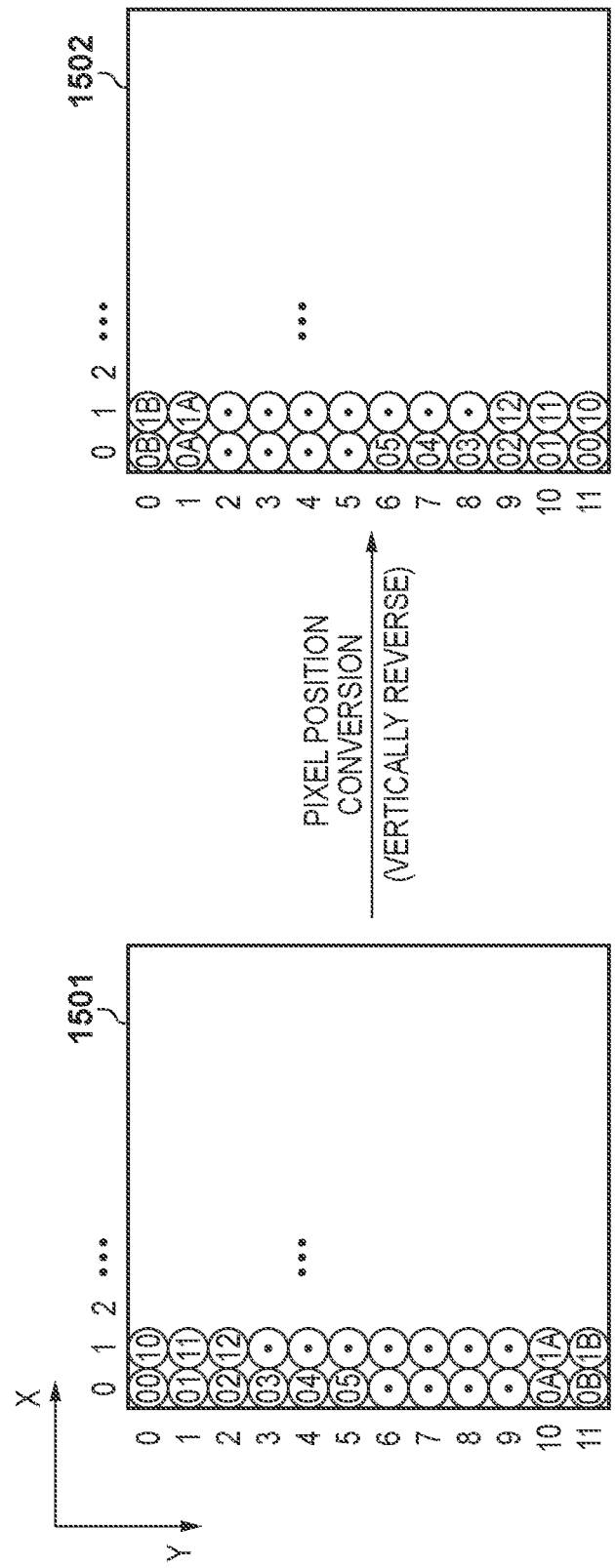

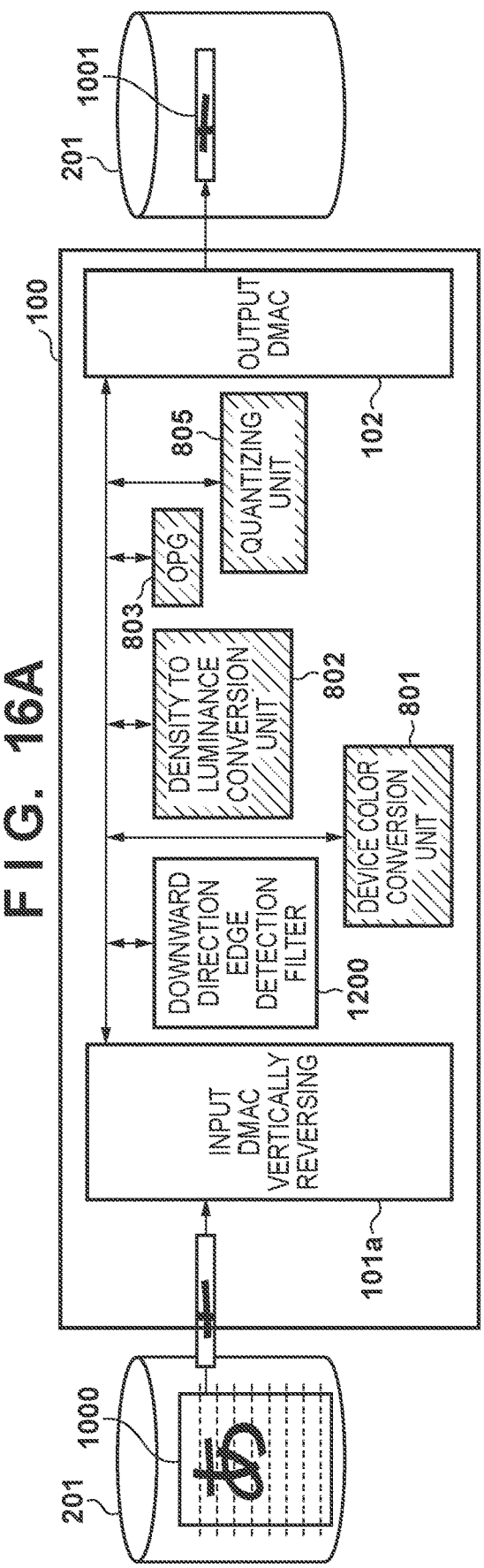
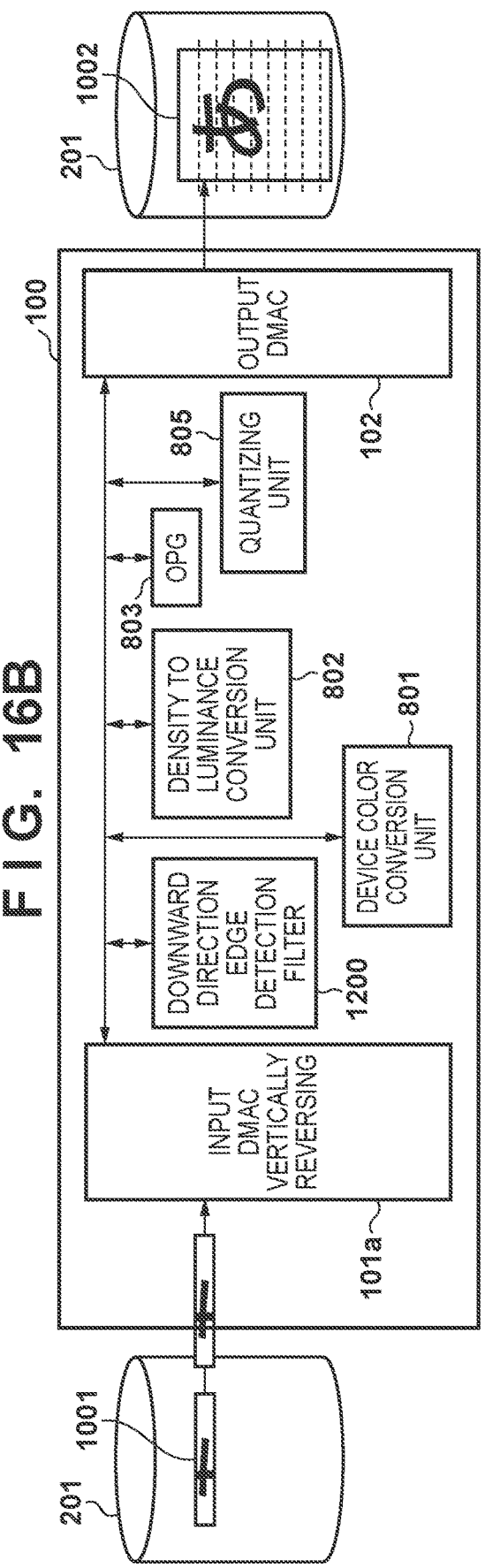

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Conventionally, when performing printing using a printing apparatus, a host device performs image processing of image data in accordance with a print format of the printing apparatus to convert the image data into print data, and transmits the print data to the printing apparatus for printing. On this occasion, the host device is required to perform high-level image processing in order to obtain a good printing result. However, with the advent of a wider variety of host devices than before, it is becoming difficult for a host device to perform processing associated with the print format of the printing apparatus. Therefore it is desired to perform optimal image processing in accordance with the print format in the printing apparatus, but it often happens that the processing capacity of the printing apparatus is lower than the host device.

On the other hand, the image quality of printed materials printed by printing apparatuses is becoming higher than before, with increased load of image processing in the printing apparatuses. As an example, Japanese Patent Laid-Open No. 2016-215571 describes a technique that obtains a printed image with a good quality by preliminarily calculating the concentration degree of ink in an inkjet recording head and correcting the print data by image processing.

However, there is a case where the order of processing (hereinafter, referred to as directivity) with regard to such image processing that processes image data is important, and the direction of processing may be inevitably determined depending on the order of arrangement of pixels in the image data to be input, or the order of inputting the image data when performing the processing. Directivity is usually associated with a mechanical configuration of the printing apparatus such as the scanning direction of the recording head, or the conveyance direction of the recording sheet. On the other hand, a printing apparatus that performs printing by scanning the recording head causes the recording head to scan bi-directionally, both in left and right directions, to perform printing, and therefore it is necessary to perform image processing in a plurality of scanning directions in order to perform appropriate processing in accordance with the scanning direction. However, the arrangement order of image data is preliminarily determined and therefore the processing direction is constrained in the order of image processing. Therefore, performing image processing with directivity has a problem such as increase of buffer, or increase of circuit scale of image processing in the device due to increased complexity of processing.

SUMMARY OF THE INVENTION

An aspect of the present invention is to eliminate the above-mentioned problem with conventional technology.

A feature of the present invention is to provide a technique for performing image processing with directivity, while suppressing increase of buffers or upsizing of the circuit required for image processing.

According to a first aspect of the present invention, there is provided an image processing apparatus, comprising: a first storage and a second storage that store image data; a reading unit that reads pixel data, corresponding to a pixel of image indicated by the image data, of the image data from the first storage or the second storage; a plurality of image processing units that perform image processing on the pixel data read by the reading unit; and a writing unit that writes the pixel data, processed by the plurality of image processing units, into the second storage, wherein one or more of the plurality of image processing units include a directivity image processing unit that performs image processing of processing target pixel data, using either pixel values of pixel data which have been input before the processing target pixel data, or a result of processing the pixel data by one of the plurality of image processing units, the writing unit performs write processing to write the processing target pixel data processed by the directivity image processing unit into the second storage in an order of arrangement which is different from the order of arrangement of pixels in the image data stored in the first storage, and the directivity image processing unit performs image processing on the image data in mutually different directions by reading and supplying to an image processing unit of the plurality of image processing units, by the reading unit, the pixel data written into the second storage.

According to a second aspect of the present invention, there is provided an image processing apparatus, comprising: a first storage and a second storage that stores image data; a reading unit that reads pixel data, corresponding to a pixel of image indicated by the image data, of the image data from the first storage or the second storage, and outputs the pixel data in a different order of arrangement from the order of arrangement of the pixels in the image data; a plurality of image processing units that perform image processing on the pixel data output by the reading unit; and a writing unit that writes the pixel data, processed by the plurality of image processing units, into the second storage, wherein one or more of the plurality of image processing units include a directivity image processing unit that performs image processing of processing target pixel data, using either pixel values of pixel data which have been input before the processing target pixel data, or a result of processing the pixel data by one of the plurality of image processing units, and the directivity image processing unit performs image processing on the image data in mutually different directions by outputting, to an image processing unit of the plurality of image processing units, the pixel data written into the second storage.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A is a timing chart for explaining pipeline processing performed by the image data processing unit according to the first exemplary embodiment;

FIG. 4B depicts a view illustrating an example of input and output pixel data of the image processing unit according to the first exemplary embodiment;

FIG. 5 is an explanatory diagram of recording performed by a recording processing unit according to the embodiment;

FIG. 6 is an explanatory diagram of a one-band-worth actual image recorded on a recording medium by a one-time left to right recording scan of the recording head according to the first exemplary embodiment, and a degree of ink concentration in a nozzle of a nozzle array arranged in the recording head;

FIG. 7 is an explanatory diagram of a one-band-worth actual image recorded on a recording medium by a one-time right-to-left recording scan of the recording head according to the first exemplary embodiment, and a degree of ink concentration in a nozzle of a nozzle array arranged in the recording head;

FIGS. 10A and 10B are explanatory diagrams of data flow with regard to image data stored in a main memory, which occurs in the first exemplary embodiment when reading pixel data by the image data processing unit, and writing pixel data to the main memory in the course of processing by the image data processing unit;

FIGS. 14A and 14B are explanatory diagrams of a series of image data processing performed using a filter on image data loaded on the main memory, according to the second exemplary embodiment of the present invention;

FIG. 15 is an explanatory diagram of an example of converting pixel positions by vertically reversing processing in the second exemplary embodiment;

FIGS. 16A and 16B are explanatory diagrams of example of another image data processing in the second exemplary embodiment;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Further, in the accompanying drawings, identical or similar components are denoted by identical reference signs, and redundant description will be omitted. In addition, an example of an image processing apparatus according to the present invention will be described in the present embodiment, taking an image forming apparatus such as an inkjet recording apparatus as an example.

Note that, in the embodiments described below, the term "record (recording)" includes not only a case of forming meaningful information such as characters, graphics or the like, but also broadly includes a case of forming images, features, patterns or the like on a recording medium, regardless of whether they are meaningful or meaningless, or processing a medium, which may or may not be visualized so that a human can visibly perceive. In addition, although sheet-like paper is assumed as a "recording medium" in the present embodiment, the medium may also be made of cloth, plastic film or the like.

First Exemplary Embodiment

Figure 2:
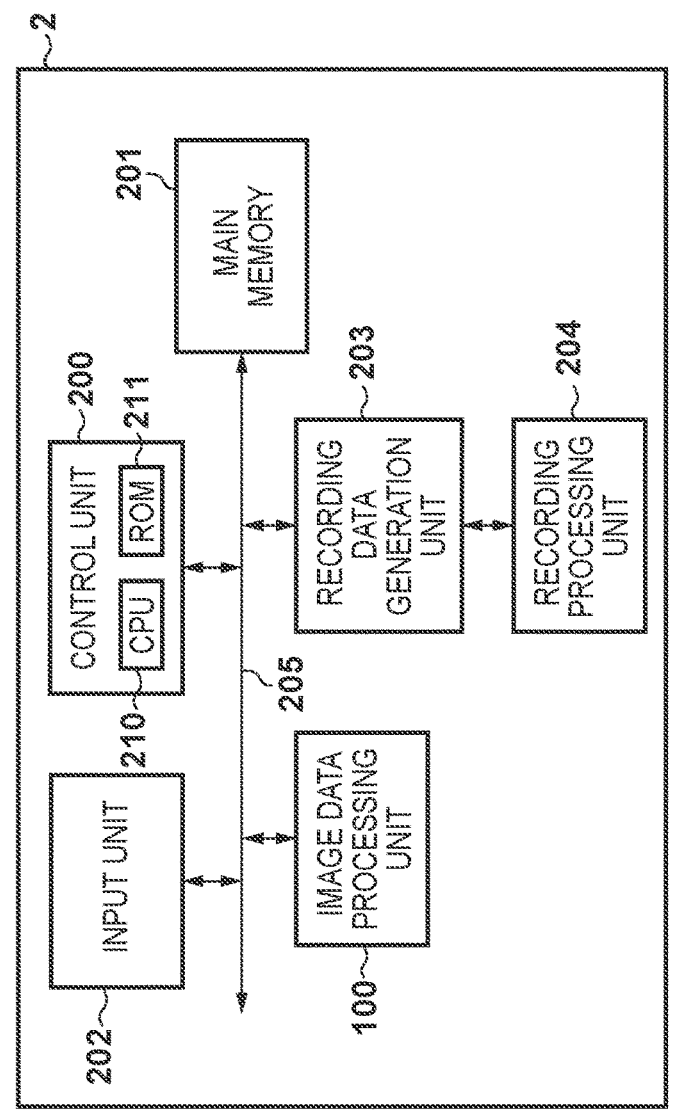
FIG. 2 is a block diagram for explaining a schematic configuration of a control system that controls an image forming apparatus according to the first exemplary embodiment of the present invention.

FIG. 2 is a block diagram for explaining a schematic configuration of a control system of an image forming apparatus according to a first exemplary embodiment of the present invention. Here, a case will be described where the image forming apparatus is an inkjet recording apparatus 2.

The multi-value image data input from an input unit 202 is stored in a main memory 201 formed of a volatile RAM, for example, via a data bus 205. Subsequently, an image data processing unit 100 reads pixel data of the image data one pixel data at a time, according to a predetermined order, performs predetermined image processing to convert the pixel data into binary data with values "1" or "0" respectively indicating "recorded" and "not recorded", and thereafter stores the binarized pixel data in the main memory 201 again. A recording data generation unit 203 reads the binary data stored in the main memory 201 in a predetermined order, and supplies the binary data to a recording processing unit 204 in association with individual nozzles of a recording head intended to be used by the recording apparatus 2. The recording processing unit 204 includes a recording head 503 (FIG. 5) provided with nozzle arrays as many as the number of corresponding ink colors, each array having arranged thereon a plurality of nozzles that discharge ink as droplets, and a conveyance unit 504 (FIG. 5) configured to execute a conveyance operation of recording media. The recording processing unit 204 uses the recording head 503 and the conveyance unit 504 described above to record images according to the recording data received from the recording data generation unit 203. A control unit 200 collectively controls the entire inkjet recording apparatus 2 including the plurality of processing units described above.

Figure 1:
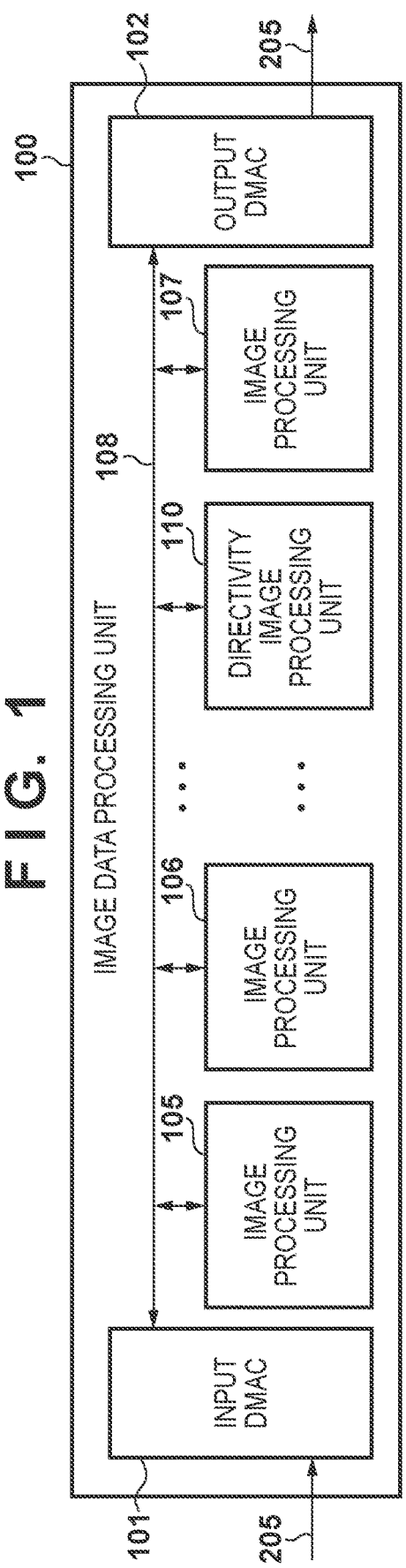
FIG. 1 is a block diagram for explaining a configuration of an image data processing unit according to a first exemplary embodiment.

FIG. 1 is a block diagram for explaining a configuration of the image data processing unit 100 according to the first exemplary embodiment.

The image data is input from the main memory 201 to an input DMAC 101 via the data bus 205. The input DMAC 101 is a DMA controller configured to output pixel data of the input image data to an internal image data bus 108 one pixel data at a time. The image data bus 108 may be an interconnection that connects each image processing unit together, or may be a crossbar switch or the like. Image processing units 105 to 107 and a directivity image processing unit 110 receive pixel data input via the common image data bus 108, and respectively output, to the image data bus 108, the pixel data subjected to intrinsic image processing. On this occasion, each of the image processing units performs image processing sequentially in a pipelined manner, by processing pixel data, which has been processed by a previous image processing unit, in superimposing manner. In addition, the directivity image processing unit 110 is an image processing unit configured to perform processing with directivity in terms of the order of arrangement of pixels in the input image data, details of which will be described below.

Upon completion of all image processing tasks, the image processing unit 107, for example, as the final processing unit, outputs the image data subjected to image processing, and the image data is then received by the output DMAC (output DMAC) 102. The output DMAC 102 writes pixel data subjected to image processing to the main memory 201 via the data bus 205, one pixel data at a time, or collectively.

Next, there will be described an arrangement of pixels in the image data to be processed by the image data processing unit 100 according to the first exemplary embodiment.

Figure 3A:
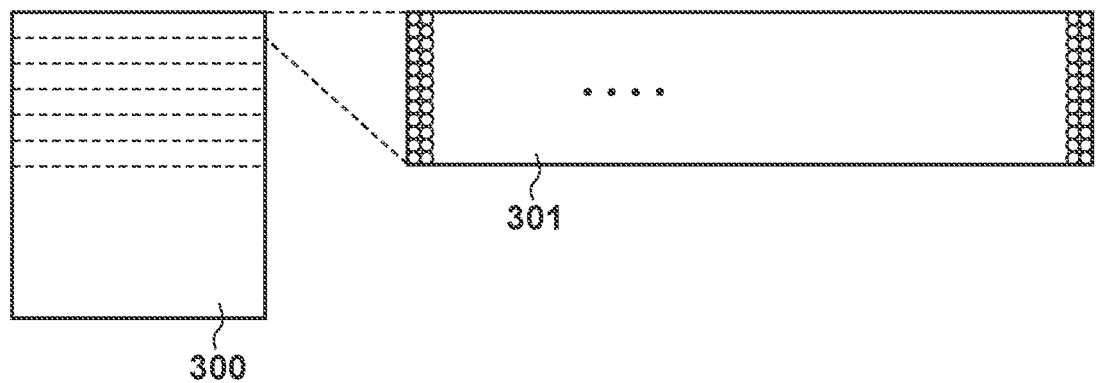
FIG. 3A is an explanatory diagram of a relation between raster image data and a band memory handled by the image data processing unit according to the first exemplary embodiment.

FIG. 3A is an explanatory diagram of a relation between raster image data and a band memory handled by the image data processing unit 100 according to the first exemplary embodiment.

The image data processing unit 100 performs image processing of, for example, one-page-worth image data 300, as illustrated in FIG. 3A. Each pixel data of the image data 300, in case of color data, has three components, namely red (R), green (G) and blue (B), each of which may take an 8-bit value ranging from 0 to 255. In case of monochrome image data, the data has a single component such as gray, and the number of components and the number of bits vary depending on the data format. Here, each of the pixel data arranged on a one-page-worth memory is loaded on the memory as the image data 300. The image data 300 is general raster data having pixel data sequentially arranged rightward, with the top left end of the image being the origin. Therefore, image data is composed such that the data is sequentially arranged from left to right and top to bottom. The image data processing unit 100 performs processing considering optimization of hardware resources by dividing the image data into a plurality of band regions, and sequentially assigning and processing each divided band region to a band memory 301.

FIG. 3A illustrates an example of dividing the one-page-worth image data 300 into band data formed of pixel columns each including 12 vertically arranged pixels. As has been described above, the image data 300 is loaded on the main memory 201 sequentially rightward and downward with the top left end being the origin 0, with the order of processing by the image processing units 105 to 107 being constrained to that direction. Although the first exemplary embodiment assumes a band configuration in which the image data 300 is processed in terms of horizontally divided rectangles, the manner of division is not limited thereto and the image data 300 may be divided into a lattice and processed in a tile-like manner.

Next, there will be described the order of image processing by respective image processing units of the image data processing unit 100.

The input DMAC 101 of the image data processing unit 100 transmits the input pixel data to the image data bus 108 one pixel data at a time.

Figure 3B:
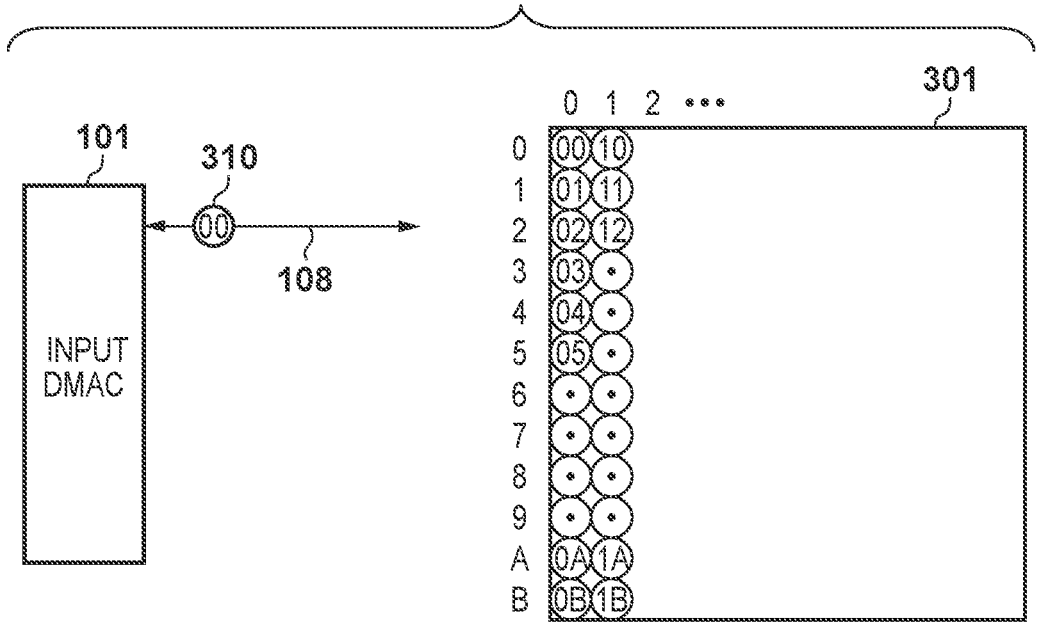
FIG. 3B is an explanatory diagram of the order of pixel data being output from an input DMAC of the image data processing unit according to the first exemplary embodiment.

FIG. 3B is an explanatory diagram of the order of pixel data being output from the input DMAC 101 of the image data processing unit 100 according to the first exemplary embodiment.

Pixel data 310 in FIG. 3B represents pixel data transmitted at that time, with the number "00" assigned to the pixel data representing pixel data of coordinates (0, 0) of the left top end of the image data 300 in FIG. 3A. In the first exemplary embodiment, an order of processing the image data 300, namely crossband processing will be described. For convenience of description, a number is assigned to each pixel data in such a manner that, starting from the pixel "00" described above, the number assigned to the next downward adjacent pixel is incremented such as "01", "02" and so on. In addition, starting from the pixel "00", the number assigned to the rightward adjacent pixel is incremented such as "10", "20" and so on.

In the crossband processing of the first exemplary embodiment illustrated in FIG. 3B, pixel data in the band is subjected to processing downward in the order of "01", "02" and so on, starting from the pixel "00". Upon reaching the lowest end "0B" (twelfth pixel in the vertical direction) of the band, the processing is further performed sequentially, starting from the top pixel "10" in the rightward adjacent column. The processing is sequentially performed in the aforementioned manner as far as the pixel at the lower right end of the band. As has been described above, the image data 300 is raster data oriented from left to right with the top left end being the origin, and therefore the directivity from top to bottom and left to right is maintained with the top left end being the origin, even when processing is performed in a crossband manner.

FIG. 4A is a timing chart explaining pipeline processing performed by the image data processing unit 100 according to the first exemplary embodiment.

The clock waveform at the top stage indicates a data output timing, and the processed pixel data is output at the rising edge of the waveform in the first exemplary embodiment. The signal waveform at the second stage, indicating an output of the input DMAC 101, is a waveform indicating a pixel to be input to the image processing unit 105. The signal waveform at the third stage, indicating an output of the image processing unit 105, is a same signal waveform as that indicating a pixel to be input to the image processing unit 106. The fourth stage, indicating an output of the image processing unit 106, is a signal waveform indicating a pixel to be input to the subsequent image processing unit. There are indicated respective data flowing through the image data bus 108 while image processing tasks are performed in a pipelined manner. Here, in FIG. 4A, numerals "00a", "01a" and the like indicate the pixel data to be output by the image processing unit 105, and "00b", "01b" and the like indicate the pixel data to be output by the image processing unit 106.

The input DMAC 101 outputs, to the image data bus 108, the pixel data which has been input from the main memory 201. At the timing of processing the top stage by the input DMAC 101 in FIG. 4A, data "01", "02" and so on are output sequentially, starting from data "00", and, upon reaching "0B", the start pixel "10" of the next column is transferred. In the aforementioned manner, the input DMAC 101 outputs pixel data to the image data bus 108 one pixel data at a time in synchronization with the rising edge of the clock signal. Each of the pixel data flowing through the image data bus 108 corresponds to one pixel data of the image data, representing each of the RGB components of the pixel data by an 8-bit or 16-bit value.

FIG. 4B depicts a view illustrating an example of the input and output pixel data of the image processing unit according to the first exemplary embodiment, here representing variation of the pixel data when processed by each image processing unit.

Pixel data "00" 310 input to the image processing unit 105 is processed by the image processing unit 105. The processing is, for example, color conversion processing using a look-up table (LUT). In a case where the input pixel data corresponds to color space data such as the device RGB, the pixel data is converted into sRGB or the like, which is the standard color space. The pixel data processed by the image processing unit 105 is represented as "00a" 400. The output pixel data "00a" 400 is processed by the image processing unit 106, which performs image processing at a stage subsequent thereto. The pixel data "00a" 400 is input to the image processing unit 106, which outputs a result of processing "00b" 401. Each image processing unit, repeating input and output of one pixel data at a time in the aforementioned manner, performs processing of one-band-worth image data to be stored in the band memory 301.

On this occasion, representing the pixel data, which is output by the image processing unit 105 and the image processing unit 106, on a timing chart results in the third stage and the fourth stage illustrated in FIG. 4A. Each image processing unit can perform pipeline processing. As such, it is intended to increase the efficiency of processing by performing image processing on the next pixel data "01" by the image processing unit 105 at the previous stage, while the image processing unit 106, which is the image processing unit at the subsequent stage, is performing image processing on the pixel data "00".

Here, for ease of explanation, the timings of image data processing are represented as same timings for all the processing tasks. In addition, the output timing of processed data is also assumed to be per-cycle outputting. However, depending on the content of processing, a two- or three-cycle delay, for example, may be tolerable for processing by respective image processing units and output timings of processing results. Accordingly, the view of the first exemplary embodiment is merely an example, and the present invention is not limited to the aforementioned timing or the like.

Next, there will be described directivity image processing according to the first exemplary embodiment. The directivity image processing refers to processing that, when processing interest pixel data, refers to a processing result of pixel data which has been input prior to the interest pixel data, and changes the content of image processing of the interest pixel data based on the processing result. First, there will be described a recording configuration of the inkjet recording apparatus 2 according to the first exemplary embodiment when applying the directivity image processing.

FIG. 5 is an explanatory diagram of recording performed by the recording processing unit 204 according to the embodiment.

Recording data generated by the recording data generation unit 203 is provided to a controller 502 via a data receiving unit 501. The controller 502 records images based on the recording data on a recording medium P such as a sheet, by controlling the recording head 503 and the conveyance unit 504. The recording head 503 is provided with nozzle arrays 507 as many as the number of corresponding ink colors, each array having arranged thereon M nozzles that respectively discharge ink droplets.

The recording apparatus 2 according to the first exemplary embodiment records an image by alternately repeating recording scan that causes moving in the X-direction intersecting the nozzle arrangement direction while discharging ink droplets from the nozzle array 507, and conveyance operation that conveys the recording medium P in the Y-direction as far as a distance corresponding to the width of recording by the recording scan.

FIG. 6 is an explanatory diagram of a one-band-worth actual image 601 recorded on the recording medium P by a one-time left to right recording scan by the recording head 503 according to the first exemplary embodiment, and a degree of ink concentration in the nozzle 602 of the nozzle array 507 arranged in the recording head 503.

In FIG. 6, the actual image 601 is an actual image recorded on the recording medium according to image data. In addition, reference numeral 604 indicates how the degree of ink concentration varies over time, when focusing on a nozzle 602 of the nozzle array 507 corresponding to a line 603 in the actual image 601. Here, the state in which standard density is realized is indicated by a concentration degree of 0. Additionally, in FIG. 6, the lines in the discharge region recorded by the nozzle 602 is indicated with black and white reversed in order to be distinguishable from surrounding lines.

Preliminary discharging irrelevant to the image data is performed immediately before starting the recording scan, during which a predetermined number of ink droplets are discharged from all the nozzles. Accordingly, the concentration degree of ink in the nozzle 602 is set to "0" immediately after starting the recording scan. Subsequently, the recording head 503 discharges ink droplets upon reaching the ink discharge region while scanning in the X-direction. On this occasion, as illustrated in FIG. 6, a non-discharge region continues at the line 603 for a certain period from the start of recording scan. During this period, water in the ink in the nozzle 602 gradually evaporates from the discharge port, whereby the concentration degree of ink increases. Subsequently, when the non-discharge region is ended and the discharge region is reached, concentrated ink droplets are discharged along with a discharging operation of the nozzle 602. Accordingly, the concentration degree of ink decreases and eventually reaches "0". In the example of FIG. 6, the discharging region continues for a while after the concentration degree has reached "0", during which the concentration degree of ink is maintained at the standard density of "0". Subsequently, when the non-discharging region is entered again, the concentration degree of ink in the nozzle 602 increases again. As such, the concentration degree of ink in the nozzle 602 depends on the discharge history of the nozzle. In other words, the concentration degree of ink in the nozzle 602 can be predicted to a certain extent, based on the recording data corresponding to the nozzle 602. For example, even when the preliminary discharging is not performed immediately before starting the recording scan, knowing the concentration degree in the immediately preceding the recording scan allows for predicting the concentration degree of ink in the nozzle based thereon.

In order to predict the concentration degree of ink in the nozzle as described above and perform image processing for correcting image data, there are provided modules such as the image processing unit 105 and the image processing unit 106 of the image data processing unit 100. In addition, although FIG. 6 illustrates an example of scanning the recording head 503 from left to right, FIG. 7 represents a similar event when scanning the recording head 503 from right to left.

FIG. 7 is an explanatory diagram of a one-band-worth actual image 601 recorded on the recording medium P by a one-time right-to-left recording scan of the recording head 503 according to the first exemplary embodiment, and a degree of ink concentration in the nozzle 602 of the nozzle array 507 arranged in the recording head 503.

Compared with FIG. 6, FIG. 7 differs from FIG. 6 only in that the scanning direction of the recording head 503 is right to left, and other description is same with FIG. 6, therefore description thereof will be omitted.

As such, concentration and deconcentration of ink in the nozzle 602 may vary also depending on the scanning direction of the recording head 503. In the first exemplary embodiment, with a recording format that causes the recording head 503 to scan bi-directionally from right to left and left to right, the aforementioned ink density correction can be adapted for correction processing in both scanning directions, i.e., from right to left and left to right, without changing the content of processing.

Figure 8:
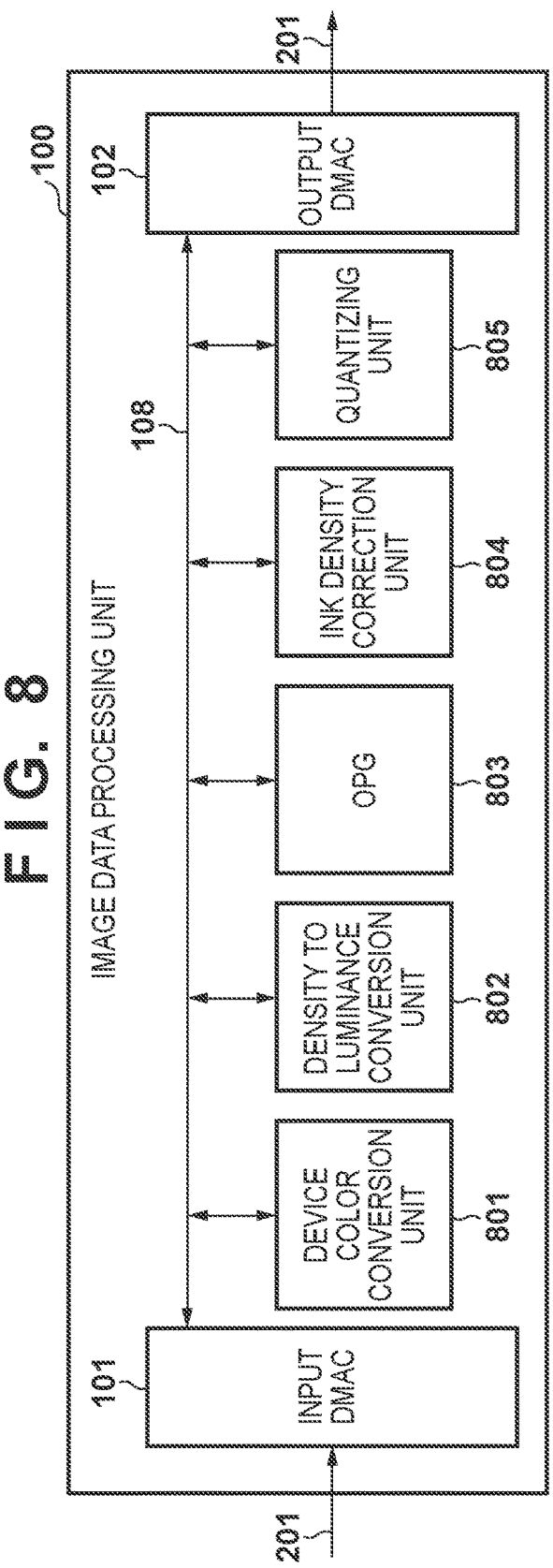
FIG. 8 depicts a view illustrating a specific example of the image data processing unit according to the first exemplary embodiment.

FIG. 8 depicts a view illustrating a specific example of the image data processing unit 100 according to the first exemplary embodiment.

The image data processing unit 100 performs five processing tasks in series starting from a device color conversion unit 801 up to a quantizing unit 805. Here, pixel data resulted from performing color conversion processing by the device color conversion unit 801 is input to a density to luminance conversion unit 802. Subsequently, pixel data resulted from performing conversion processing by the density to luminance conversion unit 802 is input to an OutPutGamma (OPG) 803. Each image processing unit performs processing in series by sequentially performing image processing while receiving a result of processing performed by an image processing unit of a previous stage.

The device color conversion unit 801 is an image processing unit configured to perform color conversion processing so as to conform with the color characteristics of the recording apparatus 2. In other words, the device color conversion unit 801 performs processing to convert each value of the input pixel data in the R, G and B color space into a color space that can be expressed by the recording apparatus 2. The density to luminance conversion unit 802 converts a density signal into a luminance signal. In other words, the RGB data which has been processed by the device color conversion unit 801 is converted, by LUT processing or the like, into CMYK data indicating ink colors for recording by the recording apparatus 2. The OPG 803 performs OutPutGamma (OPG) conversion processing. The OPG 803 is an image processing unit that performs gamma correction on pixel data, based on the amount and the color development properties of ink discharged on the sheet surface. Subsequently, an ink density correction unit 804 executes ink density correction, which is a feature of the first exemplary embodiment.

Figure 9:
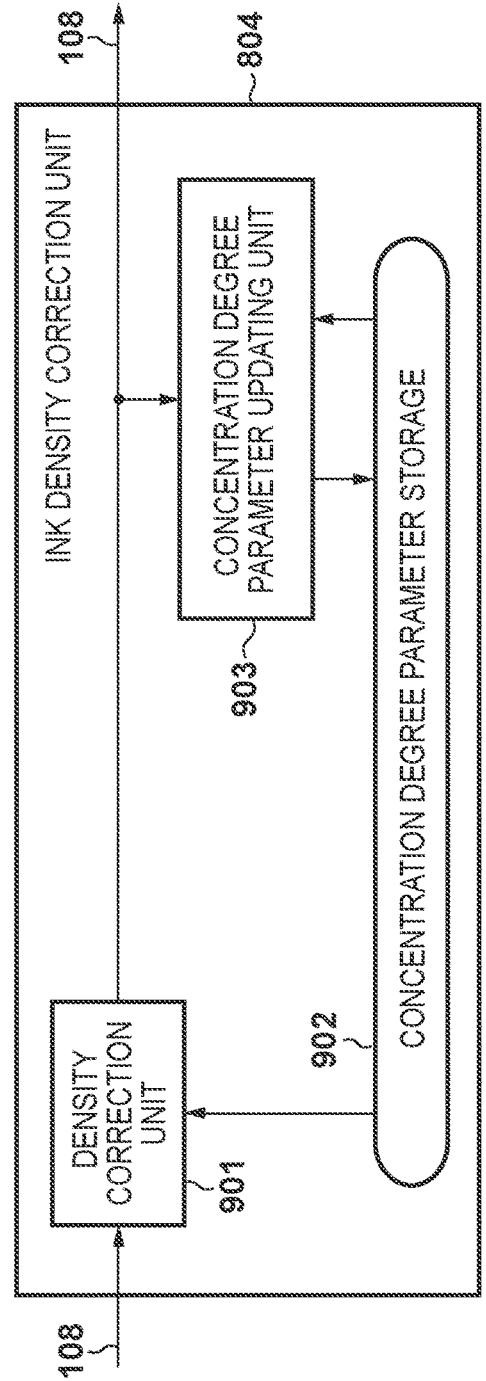
FIG. 9 is a block diagram for explaining a configuration of an ink density correction unit according to the first exemplary embodiment.

FIG. 9 is a block diagram for explaining a configuration of the ink density correction unit 804 according to the first exemplary embodiment. In the first exemplary embodiment, ink density correction is a process for correcting, by correcting the image data, the increase of ink density due to the ink being concentrated by decrease of water in ink as described above. The processing unit can be considered as a processing unit corresponding to the directivity image processing unit 110 illustrated in FIG. 1.

First, pixel data is input to the ink density correction unit 804 via the image data bus 108 one pixel data at a time. The input pixel data corresponds to the ink colors C, M, Y and K, and a density correction unit 901 performs density correction of respective plane, i.e., ink colors, independently and in parallel. Assuming that pixel data of each color is multi-value data represented by 8 bits (256 gradations), the larger the data value included in the pixel data, the darker the density of the pixel becomes. Such multi-value density data is input one pixel at a time in the order of arrangement in the crossband described in FIGS. 3A and 3B, and output to the next processing unit after the predetermined density correction has been performed by the density correction unit 901.

A concentration degree parameter storage 902 is a memory for managing a concentration degree parameter representing the degree of ink concentration in the nozzle array 507 illustrated in FIG. 5 at the current time point. The density correction unit 901 obtains a concentration degree parameter at the current time point from the concentration degree parameter storage 902, and performs correction processing of the input multi-value density data based thereon. A concentration degree parameter updating unit 903 adds information of pixel data currently processed to the concentration degree parameter stored in the concentration degree parameter storage 902, based on corrected multi-value density data corrected by the density correction unit 901, and updates the concentration degree parameter to the latest information.

Specifically, the density value of the interest pixel data is checked and, when it is the same as the value of density value of discharging (e.g., a density value equal to or higher than a value half the maximum value being set as a threshold value), ink droplets are discharged from the nozzle. Discharge of ink reduces the concentration degree of ink, and therefore the concentration degree parameter is updated to a lower value. In addition, ink is not discharged from the nozzle for a density value of not discharging ink (density value falling below the aforementioned threshold value). In this case, the concentration degree of ink increases and therefore the concentration degree parameter is updated to a higher value.

Furthermore, the corrected multi-value density data to be output from the density correction unit 901 is output to the image data bus 108, and subjected to the next processing by the image processing unit of the subsequent stage. In this processing, when a pixel being processed is selected as an interest pixel, density correction of the interest pixel is executed, referring to the result of updating of the concentration degree parameter, based on the pixel data input prior to the interest pixel.

This processing is referred to as directivity image processing because the processing result varies depending on the order of pixel data input to the ink density correction unit 804. In other words, since there is directivity corresponding to the order of input pixel data, one-time processing does not allow for representing the concentration degree of ink in a plurality of scanning directions as illustrated in FIGS. 6 and 7. Therefore, correction is limited to ink density correction corresponding to the direction of input pixel data.

And finally, quantizing processing is performed by a quantizing unit 805. In the quantizing process, the ink color concentration data processed through from the device color conversion unit 801 to the ink density correction unit 804 is subjected to quantizing processing and converted into binary data which is receivable by the recording data generation unit 203. The data thus subjected to image processing is written in the main memory 201 via the output DMAC 102.

Usually, since image processing from the device color conversion unit 801 to the quantizing unit 805 is performed only once, all the processing tasks are serially pipelined and performed in parallel. Therefore, the directivity image processing allows for processing only in a same direction as the arrangement of pixels in the input image data, which has been a limitation.

In contrast, the first exemplary embodiment allows for performing the processing by the ink density correction unit 804 twice. Furthermore, the input order of pixel data of the input image data is changed in the first and the second processing tasks. In the first processing instance, the pixel data of the input image data that is a processing target is input from left to right, whereby the ink density correction unit 804 also performs left-to-right correction. Then, in the second processing instance, the pixel data is input in the order from right to left with respect to the original input image data. Accordingly, image processing can be performed while performing the processing by the ink density correction unit 804 from right to left. The control method according to the first exemplary embodiment is illustrated in FIGS. 10A and 10B.

FIGS. 10A and 10B are explanatory diagrams of data flow with regard to image data stored in the main memory 201, which occurs in the first exemplary embodiment when reading pixel data by the image data processing unit 100, and writing pixel data to the main memory 201 in the course of processing by the image data processing unit 100. In the processing units 801 to 805 of the image data processing unit 100, processing tasks to be performed in a series of processing are represented on white background, and processing tasks to be skipped without being performed are represented on gray background.

In FIG. 10A, the main memory 201 has loaded therein image data with pixels arranged from left to right. The region of the main memory 201 is defined to be a first region 1000. The pixel data is input from the first region 1000 to the image data processing unit 100 in the crossband order (order of arrangement in the crossband) as illustrated in FIGS. 3A and 3B, and FIGS. 4A and 4B. The pixel data thus input is subjected to processing sequentially from the device color conversion unit 801 to the ink density correction unit 804. Here, the order of processing is maintained such that a pixel data which has been subjected to the first processing will be subjected to the second processing, and a pixel data which has been subjected to the second processing will be subjected to the third processing. Therefore, processing tasks will be referred to as "being performed in series".

In order to perform directivity image processing that processes pixel data in the order of input, the ink density correction unit 804 performs ink density correction from left to right, which is the order of arrangement of the pixel data of the input image data. The pixel data processed by the ink density correction unit 804 is sent to an output DMAC 102a without being subjected to quantizing processing by the quantizing processing unit 805. Subsequently, the output DMAC 102a performs pixel position conversion that mirror reverses the order of arrangement of pixels in the image data, and stores the converted pixel data in the main memory 201. The mirror reversed pixel data in the course of processing is thus stored in a second region 1001 of the main memory 201.

Figure 19A:
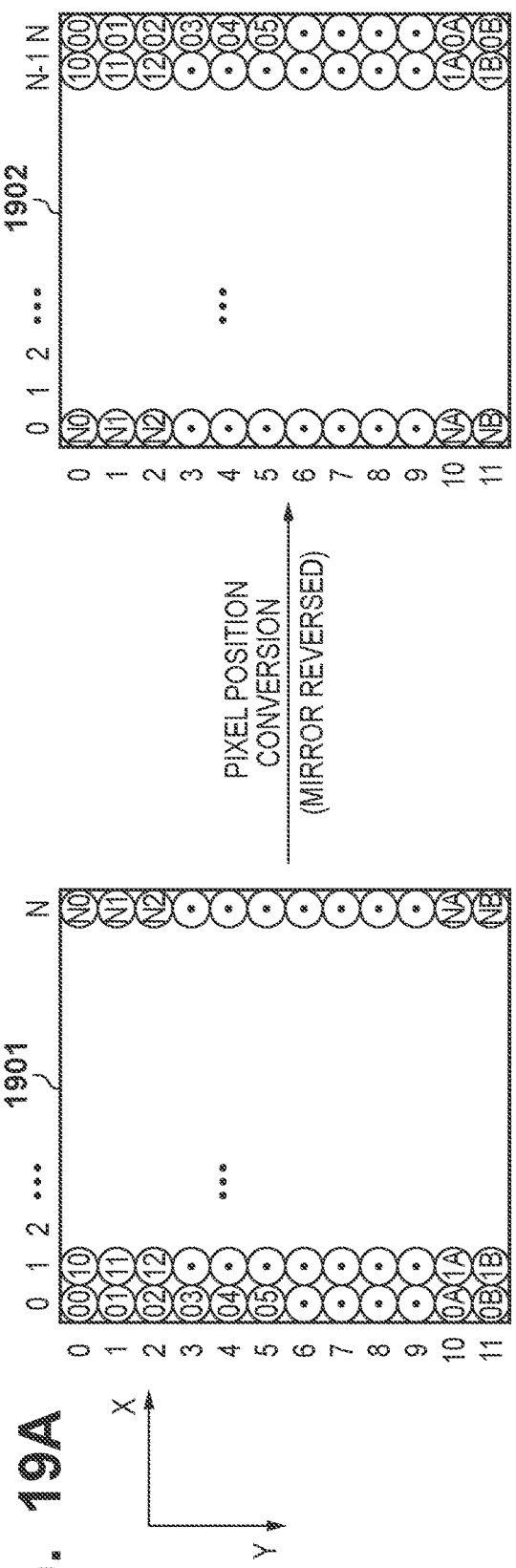
FIG. 19A depicts a view illustrating an example of pixel position conversion in mirror reversing for image data according to the first exemplary embodiment.

With regard to pixel position conversion by mirror reversing, FIG. 19A illustrates the pixels positions before and after mirror reversing. FIG. 19A illustrates an example of pixel position conversion in mirror reversing for the image data according to the first exemplary embodiment.

FIG. 19A illustrates pixel positions 1902 of a mirror reversed image by mirror reversing the pixel positions 1901 of the original image. Here, the coordinate value at the rightmost end in the X-direction is represented as N. Mirror reversing the pixel "00" whose X-coordinate is 0 and Y-coordinate is 0 in the pixel positions 1901 in the start, becomes a pixel whose X-coordinate is N and Y-coordinate is 0 in the pixel positions 1902. As such, mirror reversing performs processing to exchange left and right in the X-coordinates without changing the Y coordinates. In pixel position conversion processing of mirror reversing the image data, processing is performed to mirror reverse image data whose origin is at the top left, and arrange the converted data from the top right of the second region 1001. The image data output in the course of processing is held in the memory 201 as image data whose order of arrangement has been mirror reversed with respect to the pixels in the image data prior to input in the main memory 201.

Subsequently, FIG. 10B illustrates the manner of performing right to left processing.

In this case, the data to be input is the image data of the second region 1001 of the main memory 201, which has been output in FIG. 10A. The image data is input in the order of arrangement of pixel data in the second region 1001, similarly to the crossband order in FIG. 10A. In this example, input is performed in the same order as the order of input in FIG. 10A. Here, the arrangement of pixels in the image data in the second region 1001 has been mirror reversed by the processing in FIG. 10A, and therefore the pixel positions are sequentially input with the pixel positions remaining mirror reversed.

The data to be input here has been completed processing from the device color conversion unit 801 to the OPG 803 in FIG. 10A, and therefore this processing is not performed this time, as indicated in gray. Subsequently, processing by the ink density correction unit 804 is performed. On this occasion, the order of pixel data from the input of the pixel data to the ink density correction unit 804 is not changed. However, the order of arrangement of the pixel data arranged in the main memory 201 has been mirror reversed with respect to the original pixel data, and therefore correction processing is also performed in a mirror reversed manner. Accordingly, the ink density correction unit 804 in FIG. 10B ends up performing ink density correction on the pixel data of the original image data from right to left.

The foregoing allows for performing ink density correction in both directions, i.e., from right to left and from left to right (bi-directional ink density correction) on the pixel data of the input image data to be input. The pixel data which has been processed in the aforementioned manner is quantized by the quantizing processing unit 805, mirror reversed by the output DMAC 102a, and output to a third region 1002 of the main memory 201. Since the second region 1001 is mirror reversed with respect to the pixel data of the original image data, mirror reversing the third region 1002 again can result in the same order of arrangement of the pixel data as that in the original first region 1000. The data is thus converted into a format that can be performed recording processing by the recording data generation unit 203, and output to the main memory 201.

Figure 11:
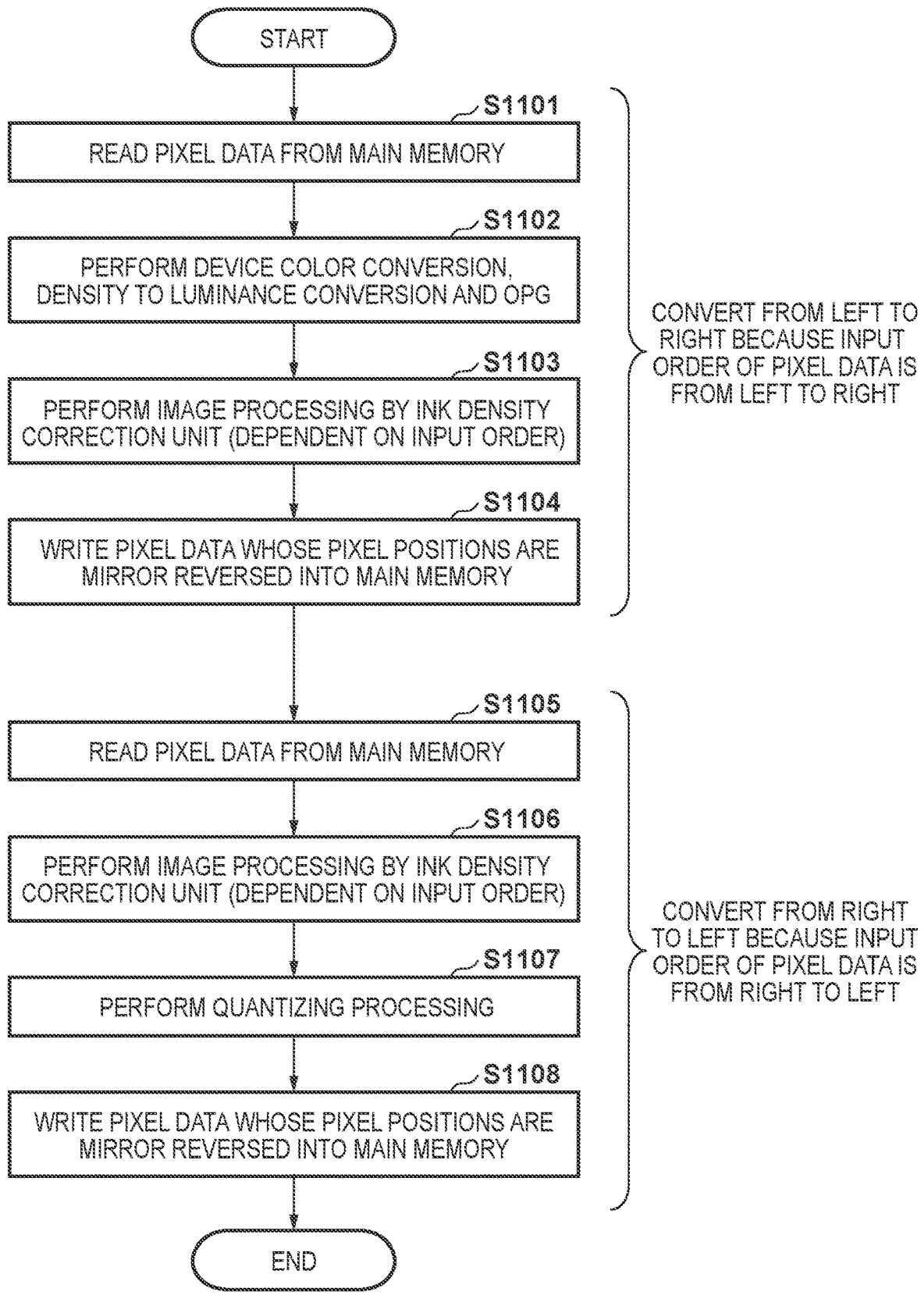
FIG. 11 is a flowchart for explaining data processing performed by a series of image processing units in a recording apparatus according to the first exemplary embodiment.

FIG. 11 is a flowchart for explaining data processing performed by the series of image processing units in the recording apparatus 2 according to the first exemplary embodiment. Here, the processing described in the flowchart is realized by executing a program stored in a ROM 211 by a CPU 210 of the control unit 200.

First, in step S1101, pixel data is read out from the first region 1000 of the main memory 201 according to an instruction from the CPU 210. The foregoing corresponds to the read processing by the input DMAC 101 in FIG. 10A. As has been described above, the read-out pixel data is sequentially sent to the image processing unit in the crossband order. Next, the process proceeds to step S1102, where the CPU 210 controls to perform various image processing. In FIG. 10A, various image processing tasks independent of the order of input data are performed, such as those performed by the device color conversion unit 801, the density to luminance conversion unit 802, the OPG 803, and the like. Next, the process proceeds to step S1103, where pixel data processed by the aforementioned image processing units is input to the ink density correction unit 804 and ink density correction is performed, under the control by the CPU 210. Here, the aforementioned directivity image processing is performed in accordance with the order of pixel data of the input image data, whereby it is possible to correct variation of recording density caused by concentration of ink when recording by scanning the recording head 503 from left to right.

Next, the process proceeds to step S1104, where the CPU 210 instructs to perform writing of the pixel data, which has been subjected to pixel position conversion by the output DMAC 102a, to the second region 1001 of the main memory. The mirror reversing processing performed by the output DMA 102a in FIG. 10A corresponds to the foregoing. The pixel data, which has been input and sequentially processed, is continuous data continuing from left to right. By subjecting the pixel data to mirror reversing processing by the output DMA 102a, the pixel data is written into the second region 1001 in the order from right to left. Accordingly, the pixel data, which is mirror reversed pixel data of the first region 1000, is stored in the second region 1001.

Next, the process proceeds to step S1105, where the CPU 210 instructs to perform read processing of pixel data from the second region 1001 of the main memory 201. This is performed by the input DMAC 101 in FIG. 10B. Here, the pixel data written into the second region 1001 at step S1104 is read in the same order as step S1101. As has been described above, mirror reversed pixel data in the course of processing is stored in the second region 1001, which will be sequentially read out from the top left end. Accordingly, the mirror reversed pixel data is sent to the subsequent image processing unit in the crossband manner. Next, the process proceeds to step S1106, where the CPU 210 instructs to perform image processing by the ink density correction unit 804. Here, the ink density correction unit 804 performs ink density correction depending on the order of the input pixel data, and therefore can correct the increase of ink density due to concentration of ink when scanning the recording head 503 from right to left.

Subsequently the process proceeds to step S1107, where the CPU 210 instructs quantizing processing by the quantizing processing unit 805. The quantizing processing unit 805 converts the multi-value pixel data into binary data by sequentially inputting the pixel data subjected to ink density correction and performing quantizing processing. Subsequently the process proceeds to step S1108, where the CPU 210 instructs to perform processing of writing the pixel data subjected to pixel position conversion to the third region 1002 of the main memory 201. Here, the output DMAC 102a in FIG. 10B mirror reverses the arrangement of the input image data in the second region 1001, and performs the processing of writing into the third region 1002. Since mirror reversing processing of pixel data is performed twice in step S1104 and step S1108 in the aforementioned manner, the image data finally output to the third region 1002 is arranged in the same order as the image data existing in the first region 1000. The process is then terminated.

Note that the processing from step S1101 to step S1104 in the flowchart processes the pixel data in the first region 1000 sequentially from left to right. On the other hand, the processing from step S1105 to step S1108 processes the pixel data in the first region 1000 sequentially from right to left. Subsequently, the recording processing unit 204 scans the recording head 503 to form (record) an image on the recording medium P, based on the recording data subjected to the bi-directional ink density correction. On this occasion, it is possible to correct the change of the concentration degree of ink when the recording head 503 is scanning from left to right (FIGS. 6A and 6B) and also when scanning from right to left (FIGS. 7A and 7B). As such, recording is performed based on the recording data on which correction processing of the ink density has implemented effectively, which allows for performing recording processing suppressing change of density due to variation of concentration degree of ink.

As has been described above, according to the first exemplary embodiment, a single ink density correction unit can execute correction processing of recording density, which is dependent on the scanning direction (horizontal direction) of the recording head and based on change of ink density due to the scanning of the recording head.

In addition, the first exemplary embodiment is advantageous in that it can perform image processing in a plurality of directions without significantly changing the content of processing by the directivity image processing unit, and suppress increase of the circuit scale and allow for more advanced image processing by suppressing effect on other image processing units to a minimum.

In addition, executing mirror reversing processing of the pixel data multiple times (twice, here) allows for finally obtaining image data arranged in the same order as the order of arrangement of pixels in the original image data.

In addition, image processing tasks other than that performed by the directivity image processing unit are performed only once, and therefore image processing can be efficiently executed.

Second Exemplary Embodiment

In the aforementioned first exemplary embodiment, the processing by the ink density correction unit 804 has been described as a processing instance having a directivity in the horizontal direction which is a scanning direction of the recording head. In contrast, a second exemplary embodiment describes a processing in the presence of a processing instance having a directivity in the vertical direction, as a downward direction edge detection filter. Here, the hardware configuration or the like of the recording apparatus 2 according to the second exemplary embodiment is similar to that of the aforementioned first exemplary embodiment, and therefore description thereof will be omitted.

Figure 12A:
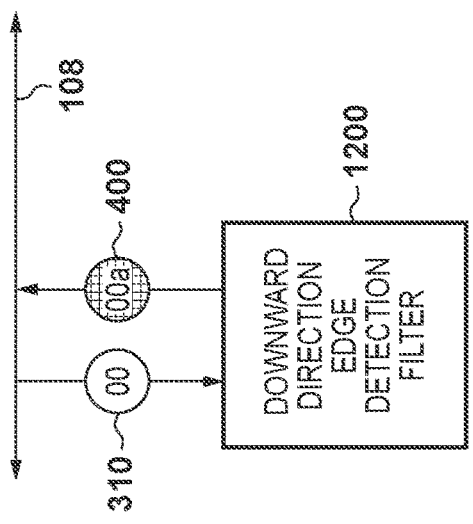
FIGS. 12A and 12B are explanatory diagrams of processing of a downward direction edge detection filter according to a second exemplary embodiment.
Figure 12B:
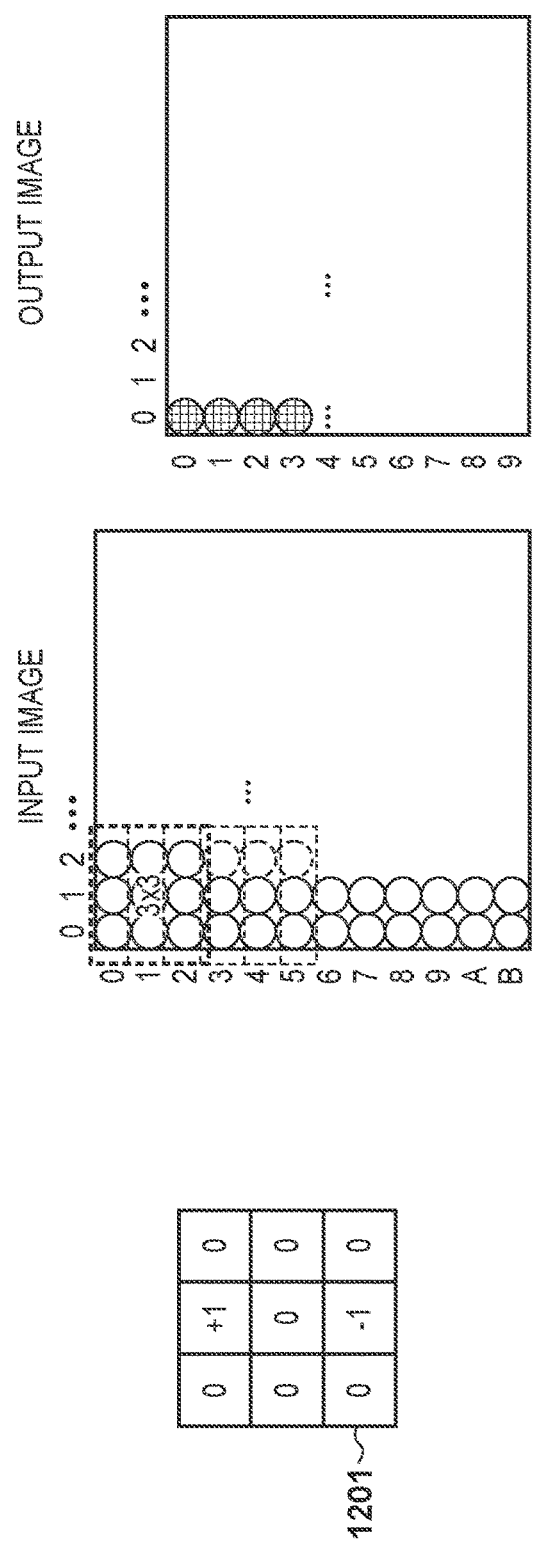

FIGS. 12A and 12B are explanatory diagrams of processing of a downward direction edge detection filter 1200 according to the second exemplary embodiment. The processing module also has a similar configuration as the image processing unit 105 and the image processing unit 106 of the image data processing unit 100, similarly to the ink density correction unit 804 and other image processing units. The processing module takes a form of performing processing on image data flowing through the image data bus 108 of the image data processing unit 100, and outputting the result of the processing to the image data bus 108.

The downward direction edge detection filter 1200 illustrated in FIG. 12A performs edge detection for filter processing, referring to an interest pixel and its peripheral area. In the second exemplary embodiment, a 3×3 reference area will be described. The downward direction edge detection filter 1200 includes a buffer that can accommodate two columns and three pixels in order to enable processing of a 3×3 reference area. When pixel data as much as the processing size has been accumulated in the buffer, pixel data corresponding to the 3×3 area is retrieved from the buffer to be subjected to arithmetic processing, and sequentially output as processed data. Also in FIGS. 12A and 12B, pixel data "00" being input to the downward direction edge detection filter 1200 is denoted by reference numeral 310, and pixel data "00a" being output from downward direction edge detection filter 1200 is denoted by reference numeral 400, respectively.

An example of a filter coefficient value of the downward direction edge detection filter 1200 is illustrated in a filter 1201. In the filter 1201, a coefficient of upper pixel is set to +1 and a coefficient of lower pixel is set to −1 with respect to the interest pixel (target pixel located at the center when being processed). Accordingly, it is possible to detect an edge part that changes downward with respect to from a pixel having a large RGB value (light colored pixels) to a pixel having a small RGB value (dark colored pixel).

FIGS. 13A to 13E are explanatory diagrams of an example of change in an internal buffer in the filter processing according to the second exemplary embodiment.

Figure 13A:
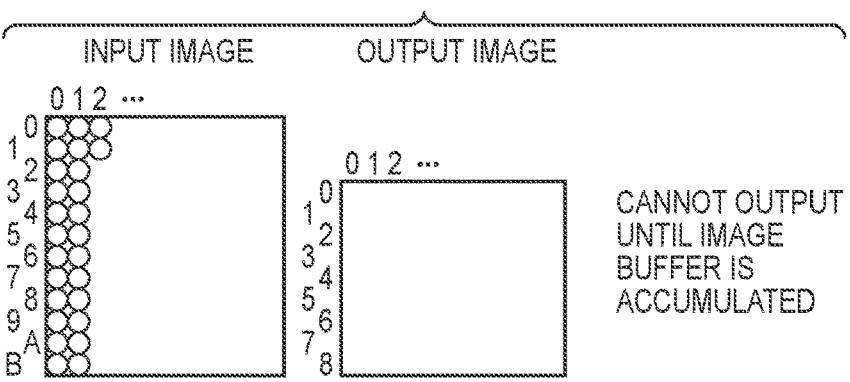
FIGS. 13A to 13E are explanatory diagrams of an example of change in an internal buffer in filter processing according to the second exemplary embodiment.
Figure 13B:
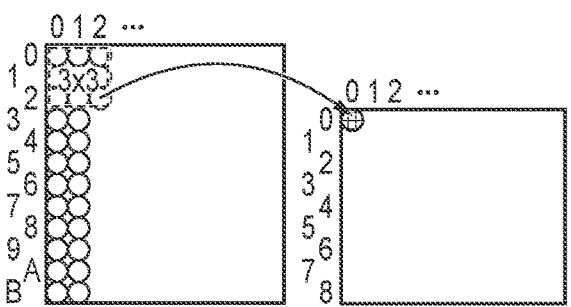
Figure 13C:
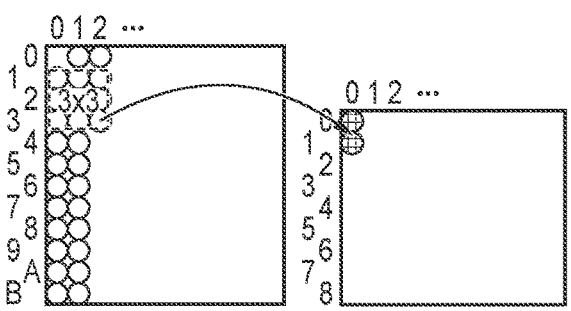
Figure 13D:
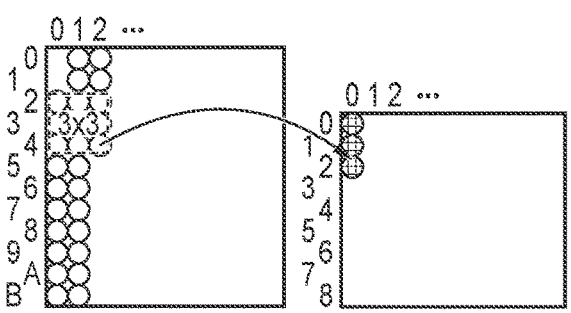
Figure 13E:
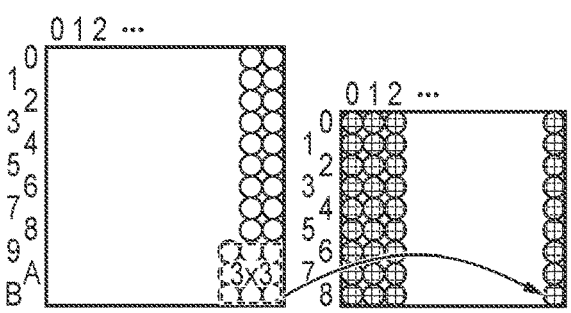

As illustrated in FIG. 13A, the input pixel data is sequentially held in the internal buffer of a 3×3 downward direction edge detection filter 1200 until the 3×3 area can be formed by the held pixel data. FIG. 13B indicates the time point at which the input buffer has received input of two columns and three pixels that can form the 3×3 area image, and the 3×3 pixels are subjected to downward direction edge detection filter processing and output. Subsequently, in FIGS. 13C and 13D, each time one pixel data is input, it is subjected to processing by the downward direction edge detection filter 1200 and the result is output while downwardly shifting the 3×3 pixel window. When, as the processing proceeds, the last pixel data in the band region is input as illustrated in FIG. 13E, the 3×3 pixels at the right bottom of the band that has been processed by the downward direction edge detection filter 1200 is output as the final output image. Accordingly, there occurs a delay from when the pixel data 310 in FIG. 12A is input to when the pixel data 400 in FIG. 12A is output. The delay is equivalent to at least (number of pixels forming two rows+vertical area size) in a case of 3×3 area pixels.

FIG. 12B is a diagram illustrates a relation between the input pixel data and the output pixel data when executing filter processing.

As a result of performing the 3×3 area image processing, image processing of the central pixel in the area is completed, and therefore FIG. 12B illustrates that the output image data has ten lines in the vertical direction, whereas the input image data has twelve lines in the vertical direction. Accordingly, the output image data is smaller than the input image data by two lines, both vertically and horizontally. The same goes for the horizontal direction. Here, although description is provided for a case where the output image data is reduced in the embodiment, it is also possible to output without size reduction (such as outputting the raw result of processing edge parts).

The size of image processing across these areas is not limited to 3×3, and may be any size such as 5×5, 7×7, 3×9, or the like. The required number of pixel buffers and number of delay pixels for the aforementioned case is at least {(N−1)×band height+M pixels}, where the size is denoted as N (horizontal)×M (vertical). In addition, it is also possible to set a size equal to or larger than the size described above, in order to simplify the processing.

FIGS. 14A and 14B are explanatory diagrams of a series of image data processing performed, using a filter, on image data loaded on the main memory 201, according to the second exemplary embodiment of the present invention.

In FIG. 14A, reading is performed using a reading unit (here, the input DMAC 101) on the image data in the first region 1000 of the main memory 201. Subsequently, filter processing is performed on the input pixel data by the downward direction edge detection filter 1200. The pixel data subjected to the filter processing is written into the second region 1001 of the main memory 201 by a writing unit (the output DMAC 102b that outputs the pixels of the image data after having vertically reversed the order of arrangement thereof), without the processing by the subsequent processing units 801 to 803 and 805 performed thereon. The output DMAC 102b vertically reverses the image data by vertically reversing the pixel positions of the pixel data and outputs the reversed image data to the main memory 201.

FIG. 15 is an explanatory diagram of an example of converting pixel positions by the vertically reversing processing in the second exemplary embodiment.

The crossband data input from the first region 1000 are indicated in an image 1501. When writing the input data into the second region 1002, the input data is written into the memory region with the positions of pixels being changed as illustrated in FIG. 15. An image 1502 indicates the region and positions of pixels at that time. A pixel "00" with the coordinate in the X-direction being 0 and the coordinate in the Y-direction being 0 in the image 1501 is output as a pixel with the coordinate in the X-direction being 0 and the coordinate in the Y-direction being 11 in the image 1502. Similarly, a pixel "01" with the coordinate in the X-direction being 0 and the coordinate in the Y-direction being 1 in the image 1501 is output as a pixel with the coordinate in the X-direction being 0 and the coordinate in the Y-direction being 10 in the image 1502. Accordingly, the vertically reversing processing writes the pixel data of the band rearranged so that the X-coordinate is unchanged and the Y-coordinate is {H−(Y-coordinate at input)}, where H is the height of the processing band.

Next, in FIG. 14B, the pixel data in the second region 1001 written in FIG. 14A is input to the image data processing unit 100 with the positional relation unchanged. The image data processing unit 100 reads the pixel data from the second region 1001 using the input DMAC 101, and transfers the pixel data to the subsequent image processing unit. The downward direction edge detection unit filter 1200 receives the input pixel data and performs edge detection by processing the data downward from top to bottom. In other words, the edge detection filter is applied to the input pixel data from top to bottom (from bottom to top, for the original input data).

Processing tasks by the device color conversion unit 801, the density to luminance conversion unit 802, the OPG 803, and the quantizing unit 805 are thus performed on the pixel data to which processing by the downward direction edge detection filter 1200 has been applied. In addition, the output DMAC 102b that vertically reverses and subsequently outputs the image data writes the vertically reversed image data, i.e., data with the same orientation as the original image data, into the third region 1002 of the main memory 201. As such, the image data is converted to have the same orientation as the original.

In addition, top and bottom of the pixel positions may be determined by the input DMAC, as illustrated in FIGS. 16A and 16B.

FIGS. 16A and 16B are explanatory diagrams of an example of another image data processing in the second exemplary embodiment.

In FIG. 16A, pixel positions are converted and read by an input DMAC 101a that receives input of image data in a vertically reversed manner. The reading with converting the pixel position corresponds to performing the reading in a vertically reversed positional relation as illustrated in FIG. 15 when inputting the pixel data in the first region 1000. The order of pixel data flowing in the image data processing unit 100 is thus vertically reversed. Therefore, performing edge detection processing of the input image data from top to bottom by the downward direction edge detection filter 1200 corresponds to performing edge detection of the image data in the first region 1000 from bottom to top. Also in this case, similarly to FIG. 14A, output is performed by the output DMAC 102, without performing processing in the image processing unit 801 to the OPG 803 and the quantizing unit 805. On this occasion, unlike the case of FIG. 14A, the output DMAC 102 does not perform conversion of pixel positions when writing into the second region 1001.

Accordingly, image data is stored in the second region 1001 of the main memory 201 according to the vertically reversed order of pixels in the first region 1000.

Next, in FIG. 16B, the image data in the second region 1001 is read in a vertically reversed manner by the input DMAC 101a that receives input of image data in a vertically reversed manner. Accordingly, image data oriented in the same direction as the image data in the first region 1000 flows into the image data processing unit 100, making it possible to detect edges from top to bottom.

Figures 17A, 17B:
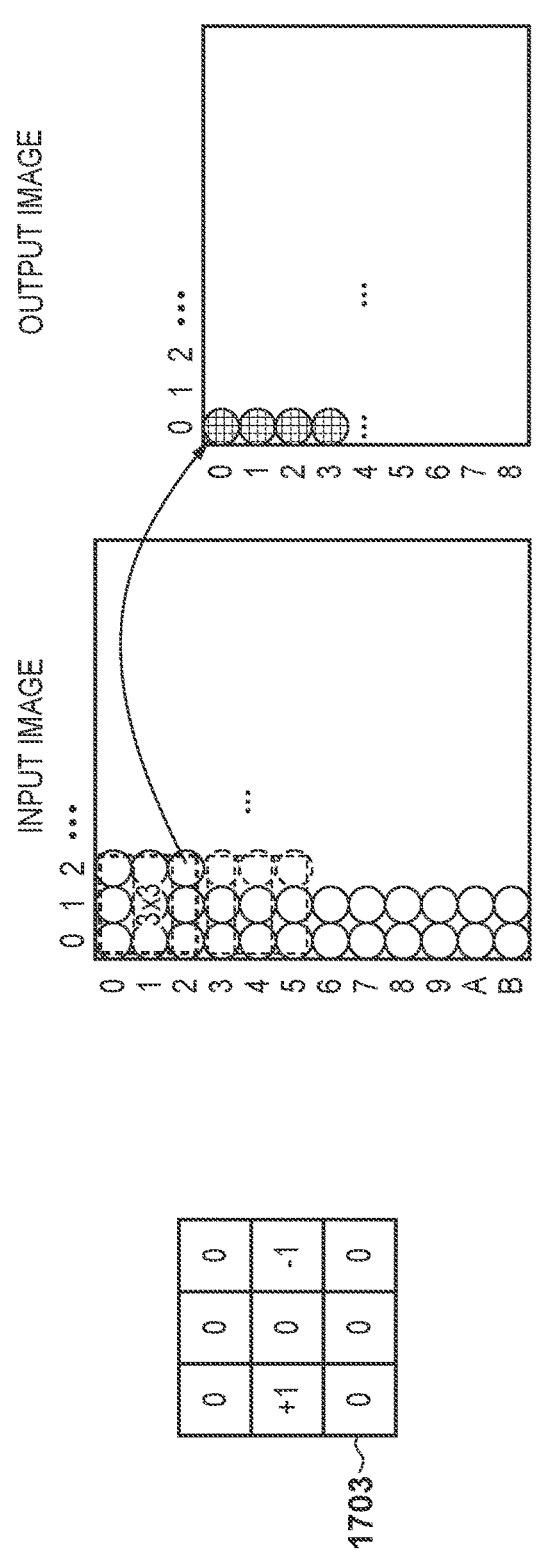
FIGS. 17A and 17B are explanatory diagrams of right direction edge detection filter processing according to the second exemplary embodiment.

Furthermore, there may be processing such as a right direction edge detection filter 1700 as illustrated in FIGS. 17A and 17B. FIGS. 17A and 17B are explanatory diagrams of right direction edge detection filter processing according to the second exemplary embodiment.

Figure 18A:
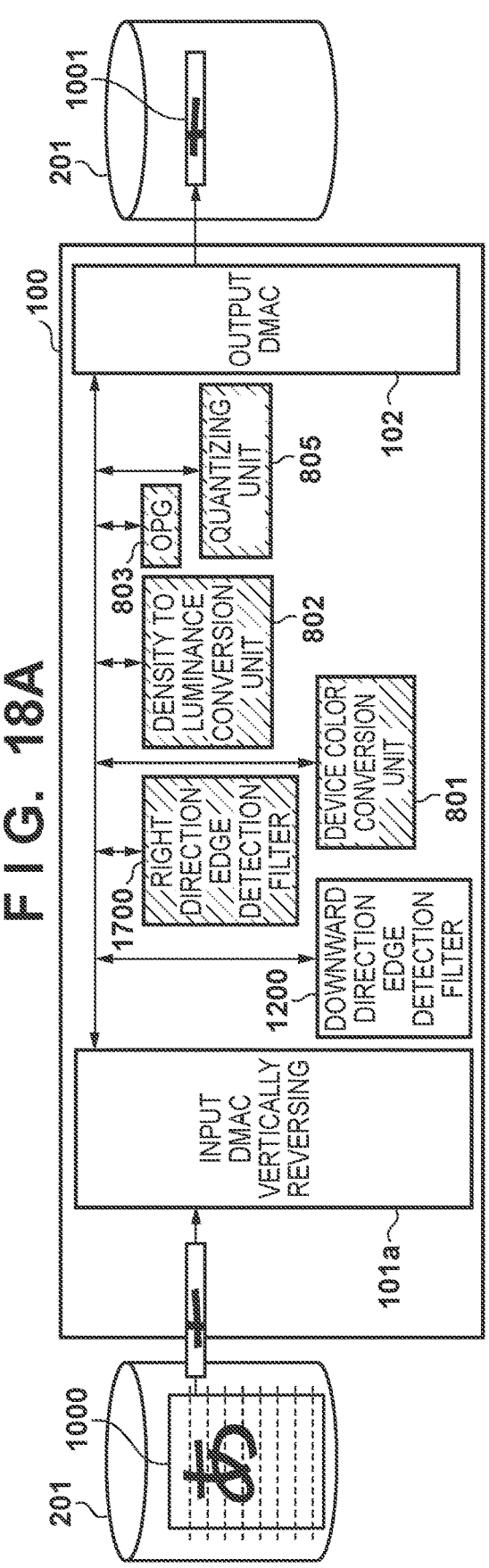
FIGS. 18A to 18C are explanatory diagrams of an example of another image data processing in the second exemplary embodiment.
Figure 18B:
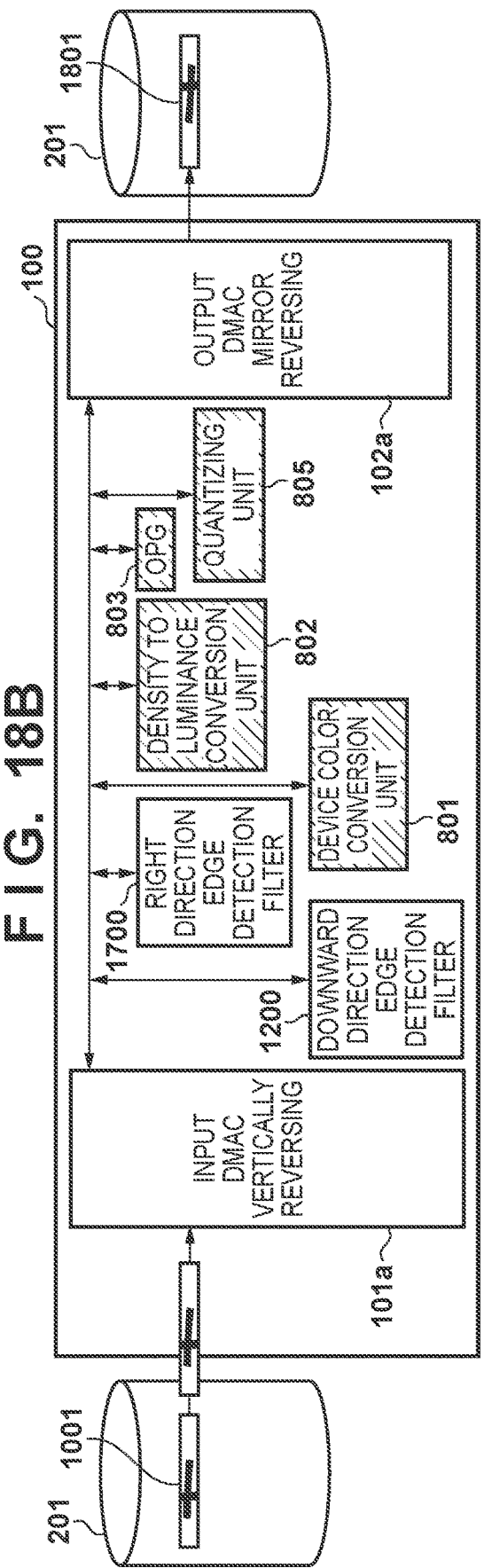
Figure 18C:
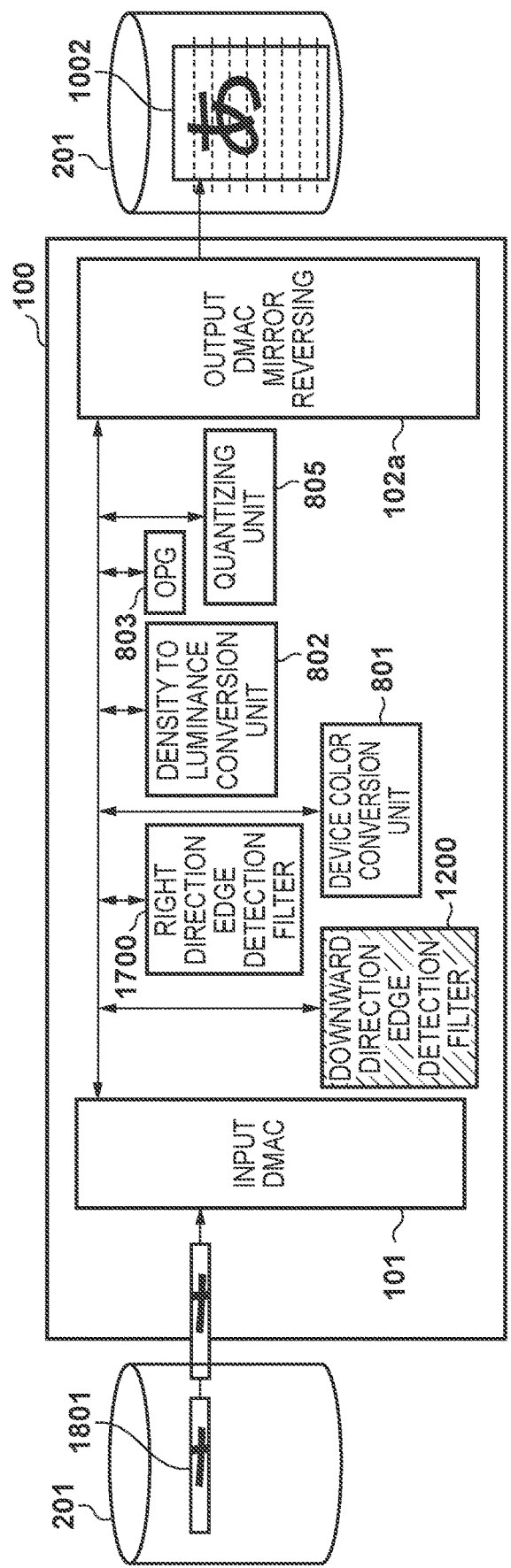

Coefficients of the filter are set in the horizontal direction to take a form like a filter 1703. Accordingly, it becomes possible to detect edges in the image data that changes from left to right. Other controls are similar to the case of the downward direction edge detection filter 1200. FIGS. 18A to 18C illustrate the processing in FIG. 17A added to the processing in FIGS. 16A and 16B, with the number of processing times of performing bi-directional processing in the horizontal direction further added thereto.

FIGS. 18A to 18C are explanatory diagrams of an example of another image data processing in the second exemplary embodiment.

FIG. 18A is essentially identical to FIG. 16A, only except for including a right direction edge detection filter 1700 added thereto. In FIG. 18B, the data in the second region 1001 is read by the input DMAC 101a in a vertically reversed manner. The processing then further continues, after having processed the input pixel data by the downward direction edge detection filter 1200, and having input the pixel data output therefrom to the right direction edge detection filter 1700. The image data in the second region 1001 is arranged in the horizontal direction in the same order as the original input image data as illustrated in FIG. 15, and therefore the right direction edge detection filter 1700 can perform edge detection on the first region 1000 from left to right. The pixel positions of the pixel data in the course of processing are reversed (here, mirror reversed) by the output DMAC 102a, and the reversed pixel data is output to a fourth region 1801 of the main memory 201. The pixel positions before and after mirror reversing are illustrated in the aforementioned FIG. 19A.

In FIG. 18C, the pixel data in the fourth region 1801 of the main memory 201 is input for processing. The pixel data in the fourth region 1801 is mirror reversed data with respect to the arrangement of pixels of the data in the original first region 1000. The read processing is performed on the data using the input DMAC 101 without converting the pixel positions. Accordingly, the pixel data input to the right direction edge detection filter 1700 is data with order of arrangement being exchanged in the horizontal direction, and therefore the right direction edge detection filter 1700 performs processing on the image data in a reversed direction with respect to the processing of FIG. 18B.

Upon completion of all the directivity image processing tasks, image processing subsequent thereto are performed, in which the pixel positions are converted (mirror reversed) again by the output DMAC 102a that performs mirror reversing of image data, and written to the third region 1002 of the main memory 201. In other words, the image data is output to the main memory 201 in a form coinciding with the order of arrangement of pixels in the original image data.

The foregoing allows for performing processing of input and/or output pixel data in a plurality of directions, despite that the image data processing unit itself is adapted to processing in only one direction. In other words, it becomes possible to perform processing with a broader variety without changing the configuration of conventional image processing units. In addition, the processing by the image data processing unit does not change the positional relation of pixels in the image data, which allows for processing without adversely affecting subsequent recording data generation units.

Although the aforementioned first and second exemplary embodiments have described processing of pixel data assuming the crossband order, the invention is not limited thereto, and processing in the order of raster direction, which is a common order of arrangement of pixels, is also possible. The order of the pixels in the image data in such a case will be described, referring to FIG. 19B.

Figure 19B:
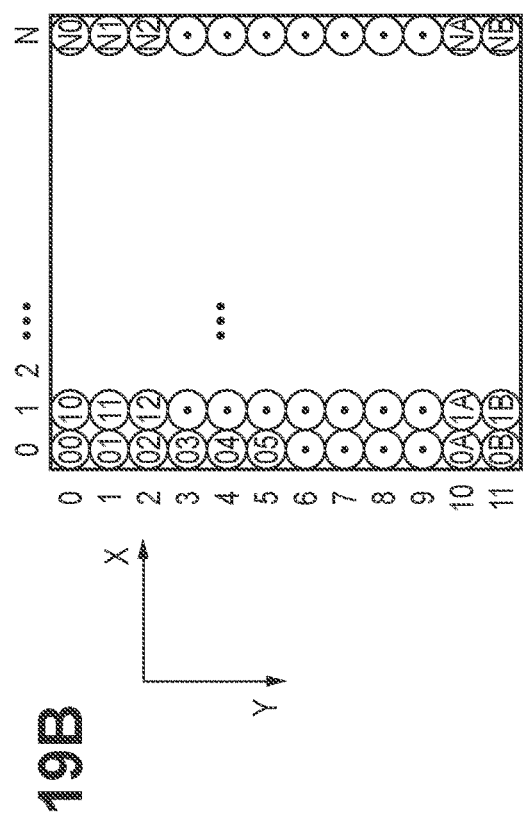
FIG. 19B depicts a view illustrating an example of pixel arrangement of image data according to another embodiment.

FIG. 19B depicts a view illustrating an example of pixel arrangement in image data according to another embodiment.

In raster processing, the processing starts from a pixel "00" whose X- and Y-coordinates are both 0, as an initial pixel data. Next, the coordinate value is incremented in the X-direction, and thus a pixel "10" whose X-coordinate is 1 and Y-coordinate is 0 is processed. With the processing continuing in the X-direction, a pixel "N0" whose X-coordinate at the right end is N and Y-coordinate is 0 is processed. The "N0" pixel is a pixel at the right end in the image data, and the processing continues with the Y-coordinate being incremented by 1 and the X-coordinate starting from 0 again. That is a pixel "01" whose X-coordinate is 0 and Y-coordinate is 1. Eventually the processing is terminated after finally having processed a pixel "NB" at the right bottom end of the image data, whose X-coordinate is N and Y-coordinate is 11.

In the first and second exemplary embodiments, the input DMAC, which is a reading unit, and the output DMAC, which is a writing unit, are configured whether or not to perform conversion of pixel positions, i.e., whether or not to perform either vertically reversing or mirror reversing. However, choice of the pixel position conversion processing according to the present invention is not limited thereto, and the configuration of the present invention is also applicable to simultaneous vertical and mirror reversing, or rotation processing by an arbitrary angle.

Furthermore, in the embodiments, the ink density correction unit 804, the downward direction edge detection filter processing, and the right direction edge detection filter processing have been described as directivity processing. However, directivity image processing is not limited thereto. The present invention is applicable to any image processing module that, when processing an interest pixel in a direction corresponding to the order of arrangement of pixels in the input image data, performs image processing using processing results of pixels preceding the interest pixel, or input pixel values.

In addition, it is assumed in the aforementioned processing that the second region 1001 is included in the main memory 201. However, the memory or the like such as the second region 1001 and the fourth region 1801 to which image data in the course of processing is output may not be provided in the main memory 201. For example, such image data in the course of processing may be held in a storage area such as the SRAM of the image data processing unit.

In addition, the foregoing description has been provided taking an inkjet printer as an example. However, recording apparatuses to which the present invention is applicable are not limited thereto, and are common to any imaging device. An imaging device may be an apparatus such as, for example, a display apparatus or a projector that outputs an image, a camera that captures a still image of an image, a video camera that captures a moving image, a scanner that converts a document or the like into image data. The present invention is thus applicable to any apparatus that can perform image processing with directivity on image data, in internal image processing.

According to the embodiments described above, it is possible to execute image processing to a maximum extent, effectively utilizing limited memory areas and hardware resources. In the aforementioned manner, the processing effect of image processing by the recording apparatus can be enhanced.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-069262, filed Apr. 15, 2021, which is hereby incorporated by reference herein in its entirety.

What is claimed is:

1. An image processing apparatus comprising:
a first storage and a second storage that store image data;
(a) one or more circuits, (b) one or more processors and at least one memory, the at least one memory being coupled to the one or more processors and having stored therein instructions executable by the one or more processors, or (c) one or more circuits, one or more processors, and at least one memory, the at least one memory being coupled to the one or more processors and having stored therein instructions executable by the one or more processors, wherein at least one of (a) the one or more circuits or (b) the execution of the instructions cause the image processing apparatus to function as a plurality of units comprising:
(1) a reading unit that reads pixel data, corresponding to a pixel of image indicated by the image data, of the image data from the first storage or the second storage;
(2) a plurality of image processing units that perform image processing on the pixel data read by the reading unit; and
(3) a writing unit that writes the pixel data, processed by the plurality of image processing units, into the second storage,
wherein one or more of the plurality of image processing units include a directivity image processing unit that performs image processing for processing target pixel data, using either pixel values of pixel data which have been input before the processing target pixel data, or a result of processing the pixel data by one of the plurality of image processing units,
wherein the writing unit performs write processing to write the processing target pixel data processed by the directivity image processing unit into the second storage in an order of arrangement which is reversed with respect to the order of arrangement of pixels in the image data read out from the first storage so that in a case that the reading unit reads, from the second storage, the pixel data written into the second storage, the reading is performed in an order which is reversed with respect to an order used when the pixel data was read by the reading unit from the first storage, wherein the directivity image processing unit performs image processing on the image data in mutually different directions by reading and supplying to an image processing unit of the plurality of image processing units, by the reading unit, the pixel data written into the second storage, wherein image processing by the directivity image processing unit is executed multiple times on the processing target pixel data, and image processing for the processing target pixel data by an image processing unit excluding the directivity image processing unit among the plurality of image processing units is performed only once, wherein the directivity image processing unit executes image processing that corrects variation of recording density due to variation of ink density dependent on scanning of a recording head for recording an image on a recording medium based on the pixel data which have been applied to the image processing by the one or more of the plurality of image processing units, in accordance with a scanning direction of the recording head, and wherein the directivity image processing unit executes filter processing that depends on the direction of arrangement of the pixels in the image data read out by the reading unit.

2. The image processing apparatus according to claim 1, wherein the pixel data written into the second storage is pixel data in the course of image processing by any of the plurality of image processing units including the directivity image processing unit, and the pixel data in the course of processing having been read out from the second storage and provided to the image processing unit by the reading unit is processed by the directivity image processing unit and at least one image processing unit among the plurality of image processing units which has not performed image processing on the image data read out by the reading unit in the course of processing.

3. The image processing apparatus according to claim 1, wherein the writing unit writes, into the second storage, pixel data which is mirror reversed with respect to the order of arrangement of pixels in the image data read out from the first storage by the reading unit.

4. The image processing apparatus according to claim 1, wherein the writing unit writes, into the second storage, pixel data which is vertically reversed with respect to the order of arrangement of pixels in the image data read out from the first storage by the reading unit.

5. The image processing apparatus according to claim 1, wherein the reading unit outputs, to the one or more of the plurality of image processing units, the pixel data which is the pixel data being read out and is vertically reversed with respect to the order of arrangement of the pixels in the image data.

6. The image processing apparatus according to claim 1, wherein the writing unit further writes, into the second storage, the pixel data which is mirror reversed with respect to the order of arrangement of the pixels in the image data read out by the reading unit.

7. The image processing apparatus according to claim 1, wherein the reading unit, the plurality of image processing units, and the writing unit are connected to a common bus, and the pixel data is input or output via the bus.

8. The image processing apparatus according to claim 1, further comprising: a recording head for recording an image on a recording medium based on the pixel data which have been applied to the image processing by the one or more of the plurality of image processing units.

9. A method of controlling image processing in an image processing apparatus including a directivity image processing unit that performs image processing for processing target pixel data, using either pixel values of pixel data which have been input before the processing target pixel data, or a result of processing the pixel data, a plurality of image processing units that perform image processing on the pixel data, and a first storage and a second storage that store image data, the method comprising:

reading pixel data, corresponding to a pixel of image indicated by the image data, of the image data from the first storage or the second storage, and outputting the pixel data to an image processing unit of the plurality of image processing units; and writing the pixel data processed by the plurality of image processing units into the second storage, wherein the writing performs write processing to write the processing target pixel data processed by the directivity image processing unit into the second storage in an order of arrangement which is reversed with respect to the order of arrangement of pixels in the image data read out from the first storage so that in a case that the pixel data written into the second storage is read from the second storage in the reading, the reading is performed in an order which is reversed with respect to an order used when the pixel data was read from the first storage; and performing, for the directivity image processing unit, image processing on the image data in mutually different directions by reading and supplying to an image processing unit of the plurality of image processing units, the pixel data written into the second storage, wherein image processing by the directivity image processing unit is executed multiple times on the processing target pixel data, and image processing for the processing target pixel data by an image processing unit excluding the directivity image processing unit among the plurality of image processing units is performed only once, wherein the directivity image processing unit executes image processing that corrects variation of recording density due to variation of ink density dependent on scanning of a recording head for recording an image on a recording medium based on the pixel data which have been applied to the image processing by the one or more of the plurality of image processing units, in accordance with a scanning direction of the recording head, and wherein the directivity image processing unit executes filter processing that depends on the direction of arrangement of the pixels in the image data read out by the reading unit.

10. A non-transitory computer-readable storage medium storing a program for causing a processor to execute a method of controlling image processing in an image processing apparatus including a directivity image processing unit that performs image processing for processing target pixel data, using either pixel values of pixel data which have been input before the processing target pixel data, or a result of processing the pixel data, a plurality of image processing units that perform image processing on the pixel data, and a first storage and a second storage that store image data, the method comprising:

reading pixel data, corresponding to a pixel of image indicated by the image data, of the image data from the first storage or the second storage, and outputting the pixel data to an image processing unit of the plurality of image processing units; and writing the pixel data processed by the plurality of image processing units into the second storage, wherein the writing performs write processing to write the processing target pixel data processed by the directivity image processing unit into the second storage in an order of arrangement which is reversed with respect to the order of arrangement of pixels in the image data read out from the first storage so that in a case that the pixel data written into the second storage is read from the second storage in the reading, the reading is performed in an order which is reversed with respect to an order when the pixel data was read from the first storage; and performing, for the directivity image processing unit, image processing on the image data in mutually different directions by reading and supplying to an image processing unit of the plurality of image processing units, the pixel data written into the second storage, wherein image processing by the directivity image processing unit is executed multiple times on the processing target pixel data, and image processing for the processing target pixel data by an image processing unit excluding the directivity image processing unit among the plurality of image processing units is performed only once, wherein the directivity image processing unit executes image processing that corrects variation of recording density due to variation of ink density dependent on scanning of a recording head for recording an image on a recording medium based on the pixel data which have been applied to the image processing by the one or more of the plurality of image processing units, in accordance with a scanning direction of the recording head, and wherein the directivity image processing unit executes filter processing that depends on the direction of arrangement of the pixels in the image data read out by the reading unit.

\* \* \* \* \*